(12) United States Patent
Sakamaki

(10) Patent No.: US 7,275,791 B2
(45) Date of Patent: Oct. 2, 2007

(54) SEAT DRIVE MOTOR AND POWER SEAT SYSTEM

(75) Inventor: Ryousuke Sakamaki, Toyohashi (JP)

(73) Assignee: ASMO Co., Ltd., Shizuoka-pref. (JP)

(*) Notice: Subject to any disclaimer, the term of this patent is extended or adjusted under 35 U.S.C. 154(b) by 370 days.

(21) Appl. No.: 10/984,806

(22) Filed: Nov. 10, 2004

(65) Prior Publication Data

US 2005/0115343 A1  Jun. 2, 2005

(30) Foreign Application Priority Data

Nov. 28, 2003 (JP) ............................. 2003-399625
Oct. 13, 2004 (JP) ............................. 2004-298963

(51) Int. Cl.
*B60N 2/23* (2006.01)
*B60N 2/12* (2006.01)
*B60N 2/16* (2006.01)
*F16H 3/06* (2006.01)

(52) U.S. Cl. ........................... 297/362.14; 297/344.17; 74/425

(58) Field of Classification Search ............ 297/362.14, 297/344.17; 74/425
See application file for complete search history.

(56) References Cited

U.S. PATENT DOCUMENTS 6,269,707 B1 * 8/2001 Koch ................. 297/362.14 X
6,789,443 B1 * 9/2004 Torii et al. ..................... 74/425

FOREIGN PATENT DOCUMENTS

JP  U-5-3022    1/1993
JP  A-8-40119   2/1996

* cited by examiner

Primary Examiner—Rodney B. White
(74) Attorney, Agent, or Firm—Posz Law Group, PLC

(57) ABSTRACT

A housing includes a support surface that supports an axial force of a worm wheel. Ribs are arranged radially inward of a peripheral wall of one end of the housing and at least partially overlaps with the worm wheel in the axial direction of the rotatable member. Ribs contact a bracket and support the support surface of the gear housing relative to the bracket in the axial direction of the worm wheel when the axial force of the worm wheel is applied to the ribs.

32 Claims, 18 Drawing Sheets

SEAT DRIVE MOTOR AND POWER SEAT SYSTEM

CROSS REFERENCE TO RELATED APPLICATION

This application is based on and incorporates herein by reference Japanese Patent Application No. 2003-399625 filed on Nov. 28, 2003 and Japanese Patent Application No. 2004-399625 filed on Oct. 13, 2004. This application is also related to U.S. application Ser. No. 10/984,751, entitled "SEAT DRIVE MOTOR AND POWER SEAT SYSTEM." filed on Nov. 10, 2004.

BACKGROUND OF THE INVENTION

1. Field of the Invention

The present invention relates to a seat drive motor and a power seat system having the same. More particularly, the present invention relates to a seat drive motor, which includes a housing installed in a vehicle seat through a bracket, and also relates to a power seat system having the same.

2. Description of Related Art

For example, Japanese Unexamined Patent Publication No. H8-40119 discloses a lift mechanism of a vehicle power seat system. In the lift mechanism, a seat drive motor, which has a speed reducing mechanism, drives a threaded shaft to linearly and axially move the threaded shaft in a forward or backward direction. When the threaded shaft is moved in the forward or backward direction, a link member, which is connected to one end of the threaded shaft, is pivoted to vertically move a vehicle seat, which is connected to the link member, in an upward or downward direction. The speed reducing mechanism includes a worm and a worm wheel, which are received in a gear housing of the motor. The worm is secured to a rotatable shaft (a drive shaft) of the motor, and the worm wheel is meshed with the worm. A threaded hole penetrates through the worm wheel in an axial direction of the worm wheel. Threads of the threaded shaft are engaged with threads of the threaded hole of the worm wheel. When the worm wheel is rotated by the motor, the threaded shaft is axially moved in the forward or backward direction. One such power seat system has a rotation sensor, which is installed in the gear housing of the motor and measures revolutions per minute (rpm), i.e., a rotational speed of the worm wheel.

When the power seat system has the above structure, in which the rotation sensor for measuring the rpm of the worm wheel is provided in an interior of the gear housing of the motor, it is difficult to install the rotation sensor in the interior of the gear housing at the time of assembling the motor.

In order to ease the installation of the rotation sensor to the gear housing, for example, Japanese Unexamined Utility Model Publication No. 5-3022 teaches provision of the rotation sensor at an outer side of the gear housing of the motor. In one such seat drive motor, one end portion of the gear housing, which extends in a direction perpendicular to the rotational axis of the worm wheel, engages a bracket, and a recess is formed in the end portion of the gear housing, which extends perpendicular to the rotational axis of the worm wheel. The rotation sensor, which measures the rpm of the worm wheel, is arranged in this recess.

However, in the above seat drive motor, at the time of driving the motor, a thrust force of the worm wheel is repeatedly applied to the portion of the gear housing, to which the rotation sensor is provided. Thus, the portion of the gear housing, to which the rotation sensor is provided, is flexed and is deformed by the thrust force. This causes a short lifetime of the gear housing. To address the above disadvantage, it is required to increase a wall thickness of the portion of the gear housing, to which the rotation sensor is provided. When the wall thickness of the gear housing is increased to reinforce the gear housing, a weight of the gear housing is disadvantageously increased, and a size of the gear housing is also disadvantageously increased. Also, this results in an increase in material costs of the gear housing.

SUMMARY OF THE INVENTION

The present invention addresses the above disadvantages. Thus, it is an objective of the present invention to provide a seat drive motor, which permits an increase in a lifetime of a housing of the seat drive motor. It is another objective of the present invention to provide a power seat system having such a seat drive motor. It is a further objective of the present invention to provide a seat drive motor, which permits a reduction in a size of a housing of the seat drive motor, a reduction in a weight of the housing and a reduction in material costs of the gear housing. It is another objective of the present invention to provide a power seat system having such a seat drive motor.

To achieve the objectives of the present invention, there is provided a seat drive motor, which includes a bracket, a housing and a motor unit. The housing is held by the bracket and receives a rotatable member and a linearly movable member. The motor unit drives the rotatable member. The linearly movable member is driven linearly through the rotatable member upon rotation of the motor unit. One end of the housing contacts the bracket. The housing includes a rotatable member support portion and at least one rib. The rotatable member support portion supports an axial force of the rotatable member, which is exerted in an axial direction of the rotatable member upon rotation of the rotatable member. At least one rib that is arranged radially inward of a peripheral wall of the one end of the housing and at least partially overlaps with the rotatable member support portion in the axial direction of the rotatable member. The at least one rib contacts the bracket and supports the rotatable member support portion relative to the bracket in the axial direction of the rotatable member when the axial force of the rotatable member is applied to the at least one rib.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings. It should be understood that the following components and arrangement thereof are not intended to limit the present invention and can be modified without departing from the scope of the present invention.

A structure of a seat drive motor of the present embodiment will be described with reference to FIGS. 1 to 13. Numeral 1 shown in FIG. 1 designates the seat drive motor of the present embodiment. The seat drive motor 1 is suitable for, for example, a lift mechanism of a power seat system S (FIGS. 16 and 17) described later and includes an electric motor unit 10, a speed reducing mechanism 20, a resin gear housing (a housing of the present invention) 30 and a sensor unit (a space member of the present invention) 40.

Figure 1:
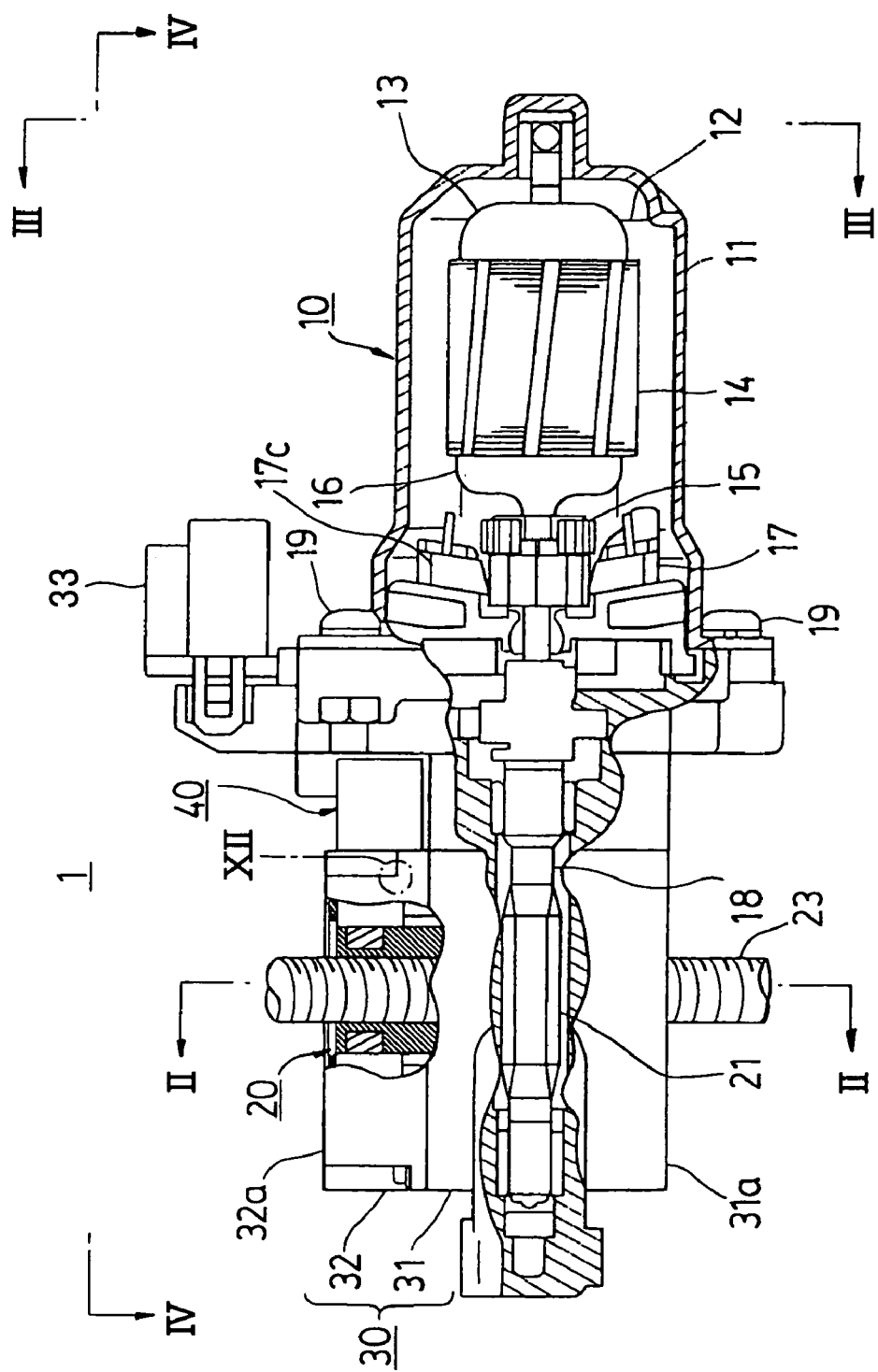
FIG. 1 is a partially fragmented side view of a seat drive motor according to an embodiment of the present invention.
Figure 3:
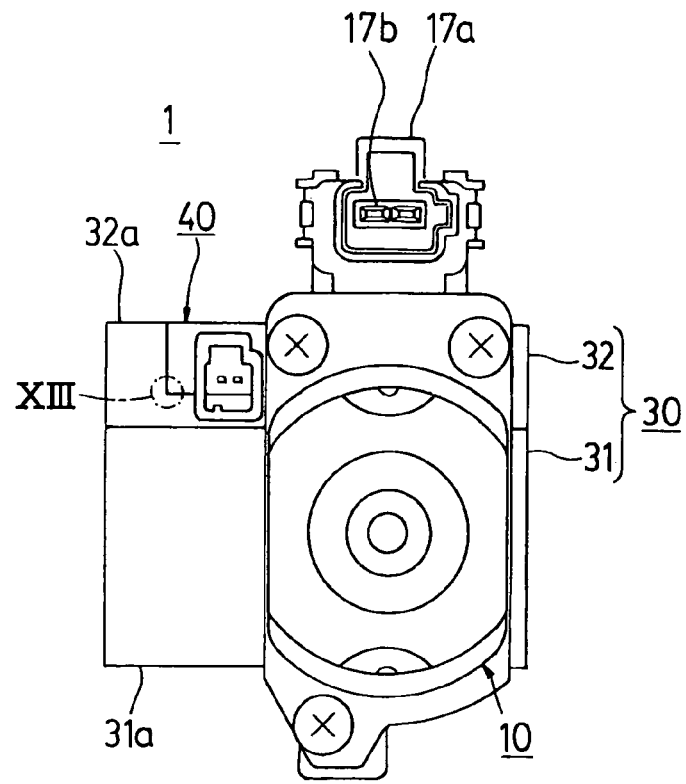
FIG. 3 is an end view along line III-III in FIG. 1.

With reference to FIG. 1, the motor unit 10 is made of a direct current (DC) brush motor and is connected to the gear housing 30 by screws 19. In the motor unit 10 of the present embodiment, magnets 12 are arranged inside a yoke housing 11, and an armature 13 is supported radially inward of the magnets 12 in a rotatable manner. The armature 13 includes a core 14 and a commutator 15. Coils 16 are wound around the core 14. Ends of the coils 16, which are wound around the core 14, are connected to the commutator 15. As shown in FIGS. 1 and 3, the motor unit 10 includes a brush holder 17. A power supply connector 17a is formed integrally in the brush holder 17. Power supply terminals 17b are provided in the power supply connector 17a. The power supply terminals 17b are electrically connected to brushes 17c provided in the brush holder 17.

Figure 2:
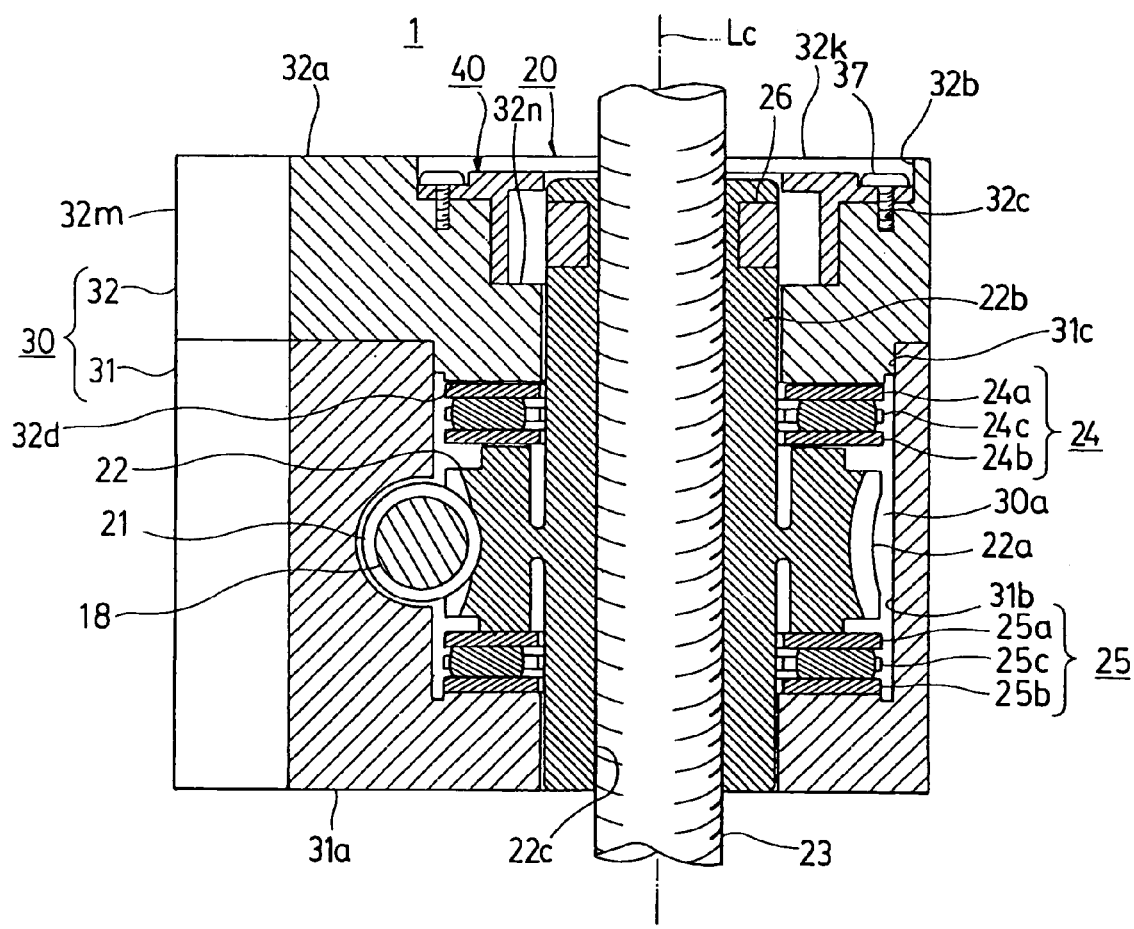
FIG. 2 is an enlarged cross sectional view along line II-II in FIG. 1.

With reference to FIGS. 1 and 2, the speed reducing mechanism 20 reduces a rotational speed of the motor unit 10 and includes a worm 21, a worm wheel (a rotatable member of the present invention) 22 and a threaded shaft 23 (a linearly movable member of the present invention). The worm 21 is formed in a free end of a rotatable shaft (a drive shaft) 18, which is provided in the armature 13, so that the worm 21 rotates integrally with the armature 13. As shown in FIG. 2, the worm wheel 22 is coaxial with the threaded shaft 23 and includes a disk shaped gear part 22a and a cylindrical extension 22b. The gear part 22a includes teeth, which are arranged at generally equal intervals in a circumferential direction. The extension 22b extends parallel to a rotational axis Lc in both upward and downward directions from the gear part 22a. The gear part 22a is meshed with the worm 21 and is rotatably supported between thrust bearing members 24, 25 in a space 30a, which is formed in the gear housing 30. With this arrangement, when the worm 21 rotates, the worm wheel 22 rotates about the rotational axis Lc.

The bearing member 24 includes two washers 24a, 24b and a bearing 24c. Similarly, the bearing member 25 includes two washers 25a, 25b and a bearing 25c. A shaft receiving hole 22c extends axially through the extension 22b. Female threads are formed in an inner wall of the shaft receiving hole 22c to threadably engage male threads of the threaded shaft 23. An annular sensor magnet 26 is arranged at an upper end (a second gear housing part 32 side end) of the extension 22b. The sensor magnet 26 includes a plurality of sets of N and S magnetic poles (e.g., two sets of N and S magnetic poles, i.e., two N magnetic poles and two S magnetic poles), which are arranged one after the other in a circumferential direction. The sensor magnet 26 rotates together with the worm wheel 22. Although in the present embodiment, the single annular magnet is used, a plurality of magnets may be provided one after another in the circumferential direction to form the sensor magnet (or a sensor magnet assembly) 26.

Figure 14:
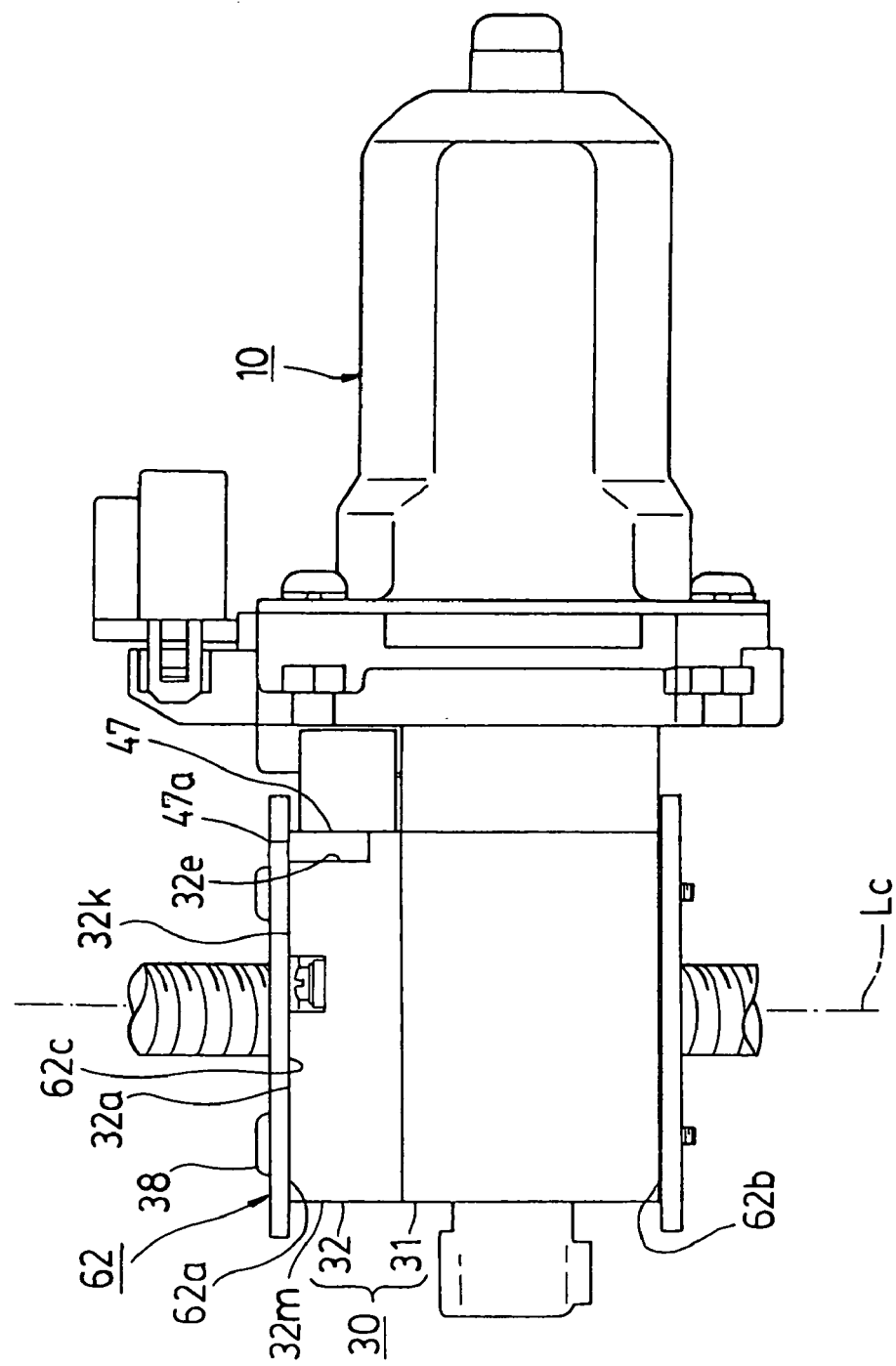
FIG. 14 is a side view of the seat drive motor, to which a holding bracket is installed.
Figure 15:
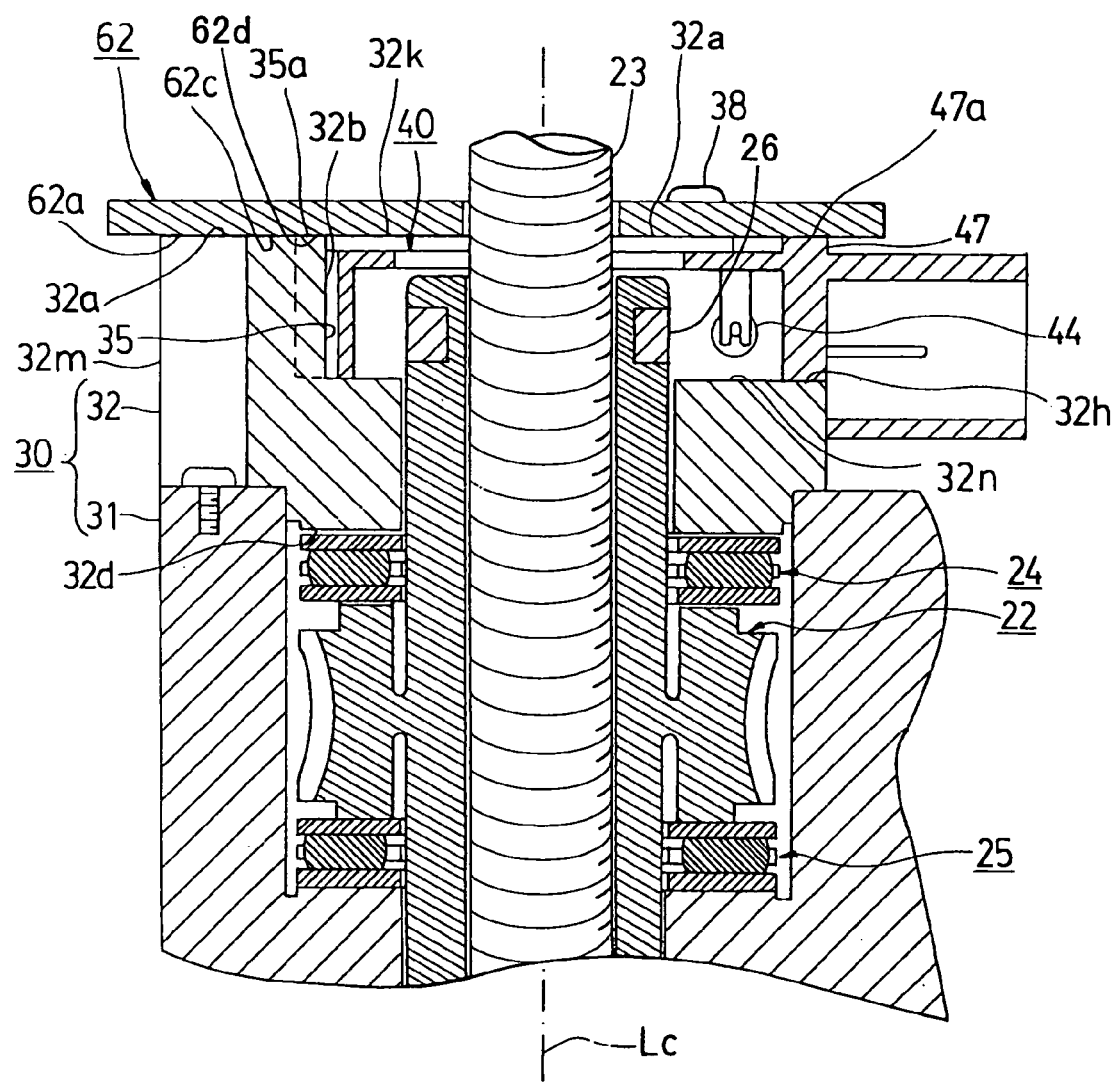
FIG. 15 is an enlarged partial cross sectional view of the seat drive motor, to which the holding bracket is installed.
Figure 16:
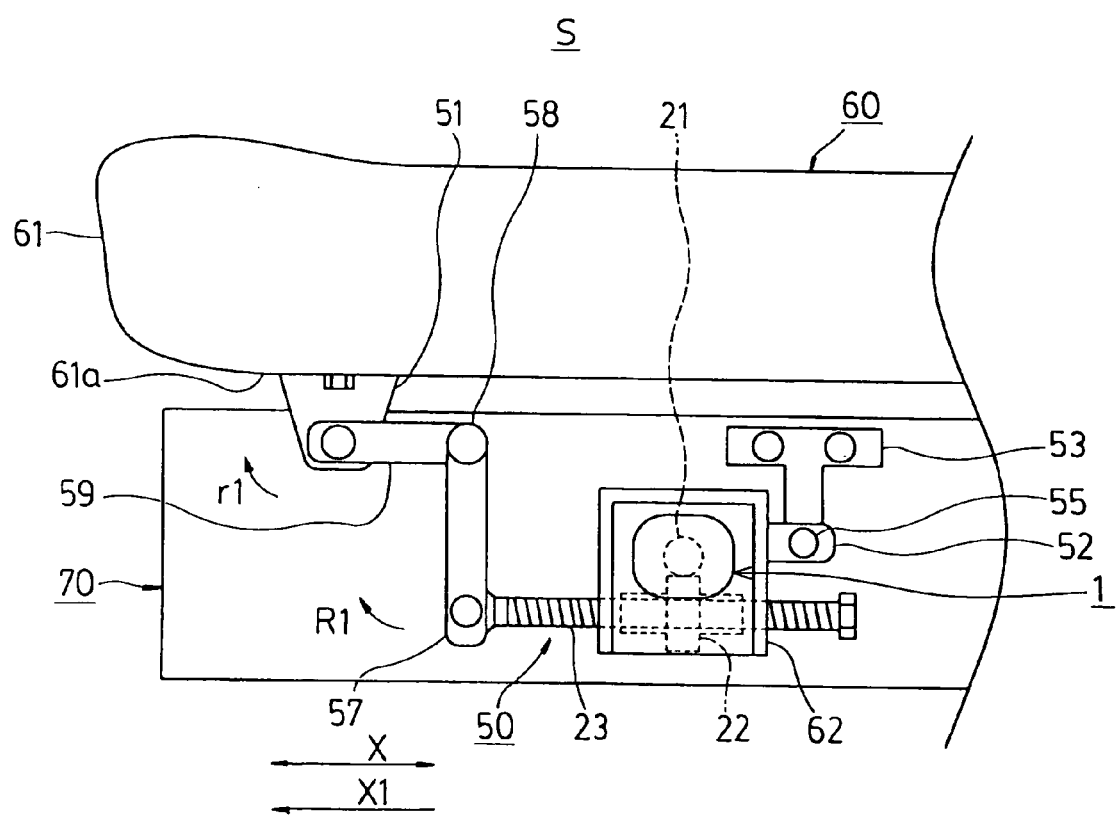
FIG. 16 is a partial schematic view of a power seat system of the present embodiment.

The gear housing 30 receives the speed reducing mechanism 20 and includes a first gear housing part 31 and a second gear housing part 32, as shown in FIGS. 1 to 3. As will be described later, when the seat drive motor 1 is installed to a vehicle seat 60, the gear housing 30 is clamped by a generally U-shaped bracket 62 that has two generally flat portions 62a, 62b, which are opposed to one another (FIGS. 14-16). Thus, an end portion 31a of the first gear housing part 31 and an end portion 32a of the second gear housing part 32 are made flat to stabilize connection between the gear housing 30 and the bracket 62. Here, the end portion 32a of the second gear housing part 32 is formed to extend perpendicular to the rotational axis Lc of the worm wheel 22 and serves as one end portion of the gear housing 30 of the present invention that extends perpendicular to the rotational axis of the rotatable member. It should be noted that even when the worm wheel 22 is made shorter in the axial direction, the end portion 32a of the present invention still extends perpendicular to the rotational axis Lc.

Figure 4:
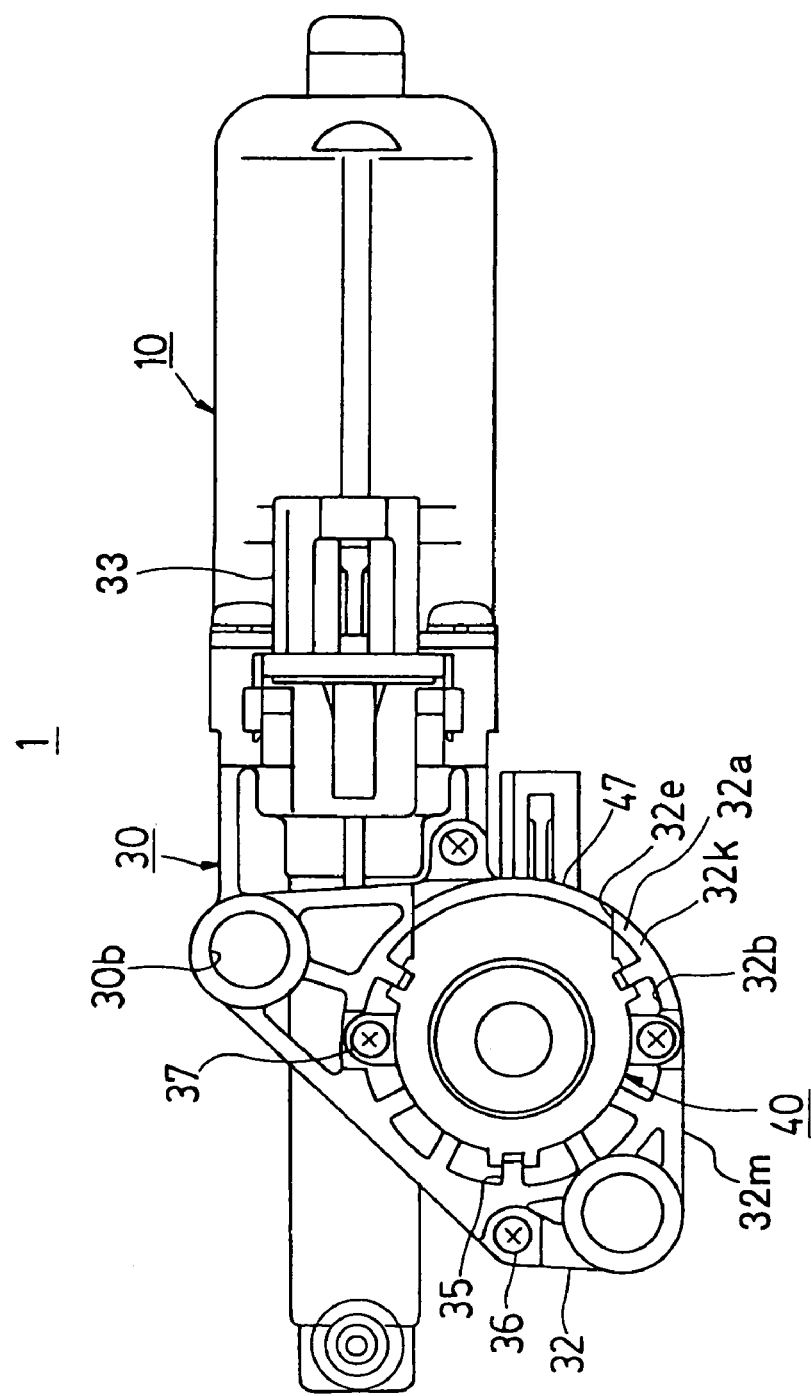
FIG. 4 is a plan view along line IV-IV in FIG. 1.

As shown in FIG. 4, the gear housing 30 includes bracket connection holes 30b. Screws 38 (FIG. 14) are inserted into the bracket connection holes 30b, respectively, through corresponding holes of the bracket 62 to connect the bracket 62 to the gear housing 30. As shown in FIG. 2, the first gear housing part 31 includes a recess 31b, which has an opening 31c on a side opposite from the end portion 31a. The gear part 22a and the bearing members 24, 25 are rotatably received in the recess 31b. The second gear housing part 32 of the present embodiment has a support surface 32d on a side (a first gear housing part 31 side) opposite from ribs 35, which extend radially inward from a peripheral wall 32m of the second gear housing part 32. The bearing member 24 is arranged between the gear part 22a of the worm wheel 22 and the support surface 32d of the second gear housing part 32. The bearing members 24, 25 are the thrust bearing members, which hold the worm wheel 22 at the time of moving the worm wheel 22 in the axial direction.

Figure 5:
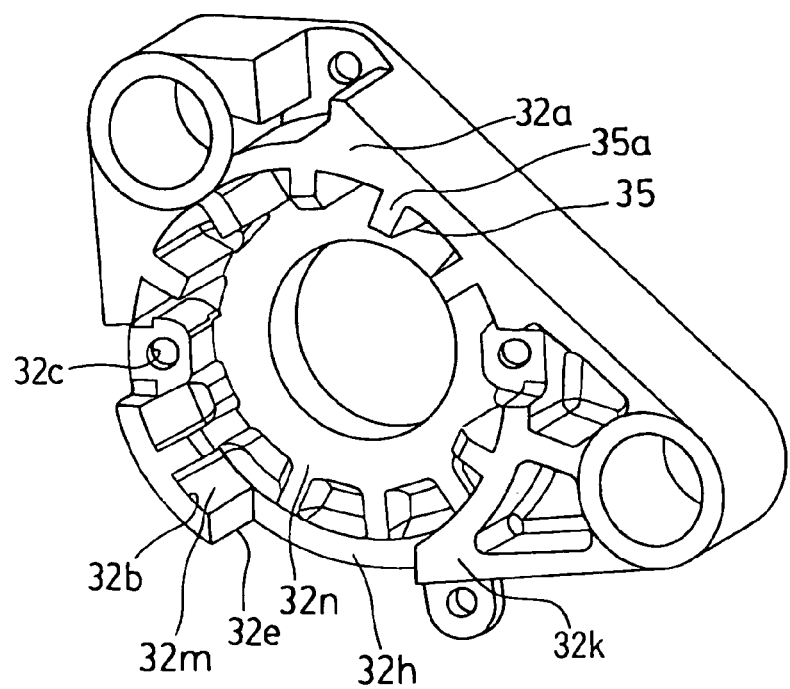
FIG. 5 is a front perspective view of a second gear housing part of the seat drive motor.

The second gear housing part 32 is constructed to close the opening 31c of the first gear housing part 31. The second gear housing part 32 is connected to the first gear housing part 31 by screws 36 (FIG. 4). Furthermore, as shown in FIG. 5, a receiving recess 32b is formed in the second gear housing part 32 to receive the sensor unit 40, which will be described in greater detail below. The receiving recess 32b is formed as a recess, which is surrounded by the peripheral wall 32m and has a circular opening in the end portion 32a. Screw holes 32c are formed at an outer peripheral part of the receiving recess 32b of the second gear housing part 32 to threadably connect the sensor unit 40 to the second gear housing part 32.

As shown in FIGS. 4 and 5, the ribs 35 (seven ribs 35 in the present embodiment) are provided in the receiving recess 32b to increase an axial strength of the second gear housing part 32. Each rib 35 extends in the axial direction of the receiving recess 32b and is formed as a ridge, which projects inwardly in the radial direction of the receiving recess 32b from the peripheral wall 32m. An end surface 35a of the rib 35 is substantially flush with an end surface 32k of the end portion 32a of the second gear housing part 32, more specifically, the end surface 32k of the peripheral wall 32m of the second gear housing part 32. Thus, the end surface 32k of the second gear housing part 32 and the end surface 35a of each rib 35 extend in a common plane, which is perpendicular to the axial direction of the worm wheel 22. In this way, the end surface 32k of the second gear housing part 32 and the end surface 35a of each rib 35 substantially simultaneously engage the flat portion 62a of the bracket 62.

In other words, in the present embodiment, as shown in FIG. 15, when a gear housing side contact surface 62c of the bracket 62, which is opposed to the end surface 32k of the end portion 32a of the second gear housing part 32, contacts the end surface 32k of the end portion 32a of the second gear housing part 32, a rib side contact surface 62d of the bracket 62, which is opposed to the end surface 35a of the rib 35, contacts the end surface 35a of the rib 35. Furthermore, in the present embodiment, the gear housing side contact surface 62c of the bracket 62, which is opposed to the end surface 32k of the end portion 32a of the second gear housing part 32, and the rib side contact surface 62d of the bracket 62, which is opposed to the end surface 35a of the rib 35, are formed in the same plane, which is perpendicular to the axial direction Lc of the worm wheel 22.

Figure 6:
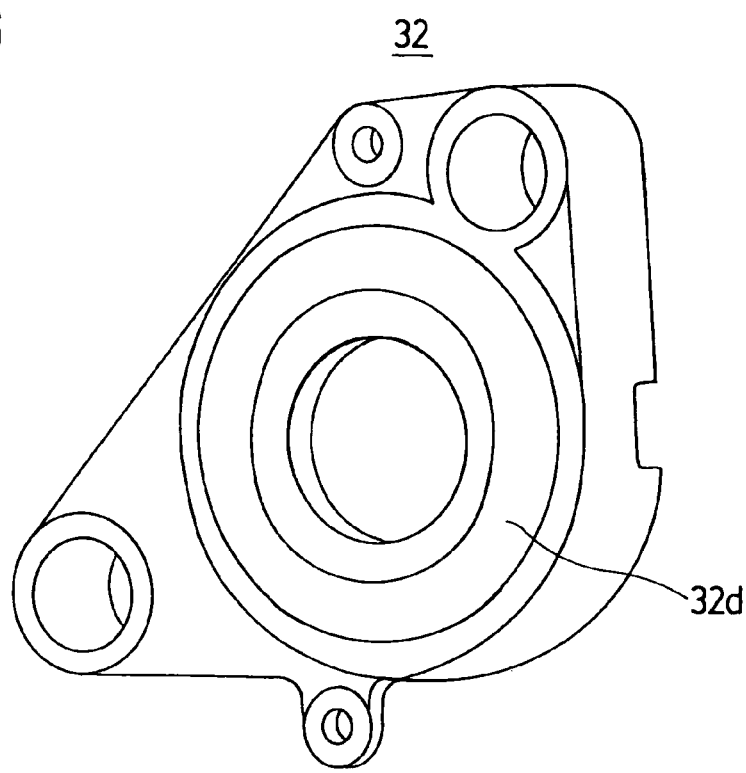
FIG. 6 is a rear perspective view of the second gear housing part of the seat drive motor.

In the second gear housing part 32 of the present embodiment, the support surface 32d, which is provided on the side (the first gear housing part 31 side) opposite from the ribs 35, supports the gear part 22a of the worm wheel 22 and the bearing member 24 (FIGS. 2 and 6). With this structure, the axial force, which acts in the direction parallel to the rotational axis Lc of the worm wheel 22, can be supported by the support surface 32d. That is, when the thrust force is applied to the worm wheel 22, the bearing members 24, 25 support the thrust force. The support surface 32d supports the thrust force of the worm wheel 22 through the bearing member 24. The ribs 35 overlap with the support surface 32d in the axial direction of the rotational axis Lc of the worm wheel 22 in such a manner that the ribs 35 effectively receive a thrust force even when the support surface 32d receives the thrust force from the worm wheel 22. The support surface 32d corresponds to a rotatable member support portion of the present invention.

As shown in FIG. 5, a portion of the peripheral wall 32m of the recess 32b is axially recessed to form a notch or groove 32e that radially extends through the peripheral wall 32m of the recess 32b. A terminal plate 43 is arranged in the groove 32e to externally output a rotation measurement signal, i.e., a sensor signal. A support wall 47 (FIG. 7), which is formed in the sensor unit 40, is engaged with the groove 32e.

Figure 7:
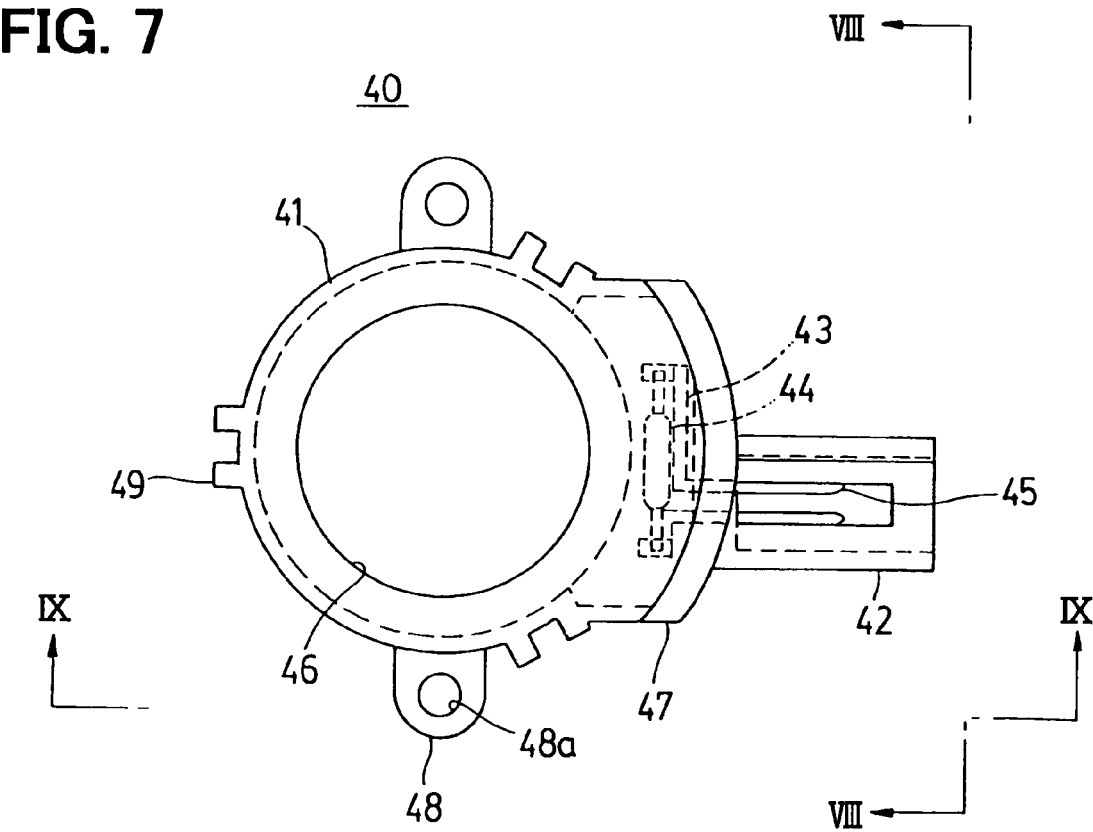
FIG. 7 is a plan view of a sensor unit of the seat drive motor.
Figure 8:
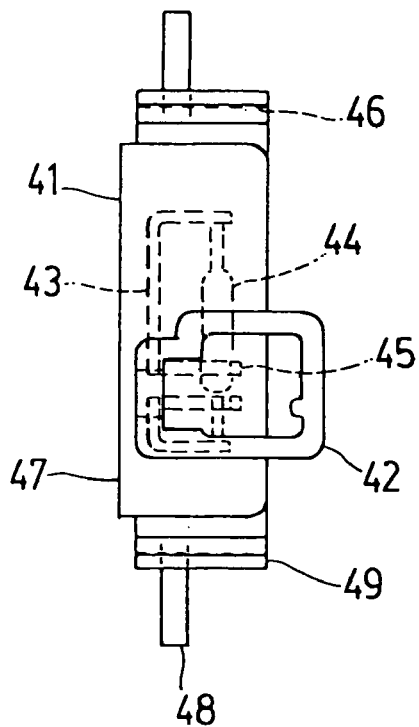
FIG. 8 is an end view along line VIII-VIII in FIG. 7.
Figure 9:
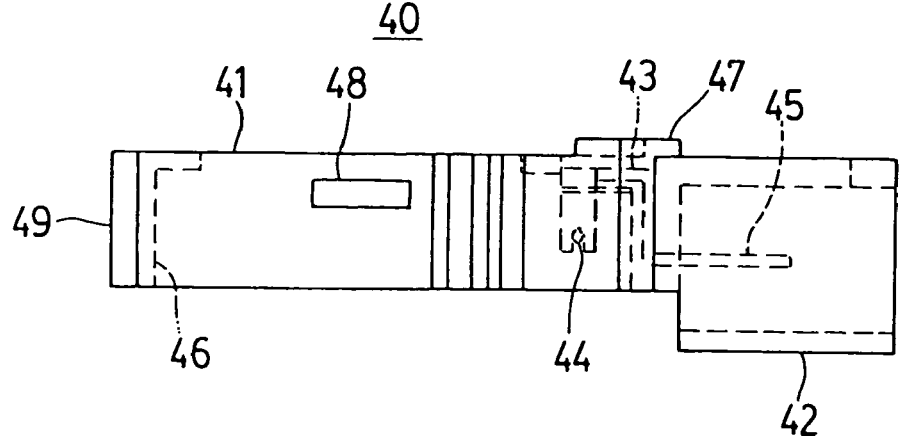
FIG. 9 is a side view along line IX-IX in FIG. 8.

As shown in FIGS. 7 to 9, the sensor unit 40 includes a unit main body 41 and a connector 42. The terminal plate 43 is provided in the unit main body 41. A rotation sensor or a rotation sensor element (e.g., a bimetal or a Hall element) 44, which generates electricity in response to a change in a magnetic force, is connected to an end of the terminal plate 43. Output terminals of the rotation sensor 44 are connected to connector terminals 45 through the terminal plate 43. A through hole 46 is formed in a center of the unit main body 41 to receive the threaded shaft 23 therethrough. The support wall 47, which protrudes in the axial direction of the unit main body 41 and extends arcuately in a circumferential direction of the sensor unit 40, is provided at a connector 42 side of the unit main body 41.

Figure 10:
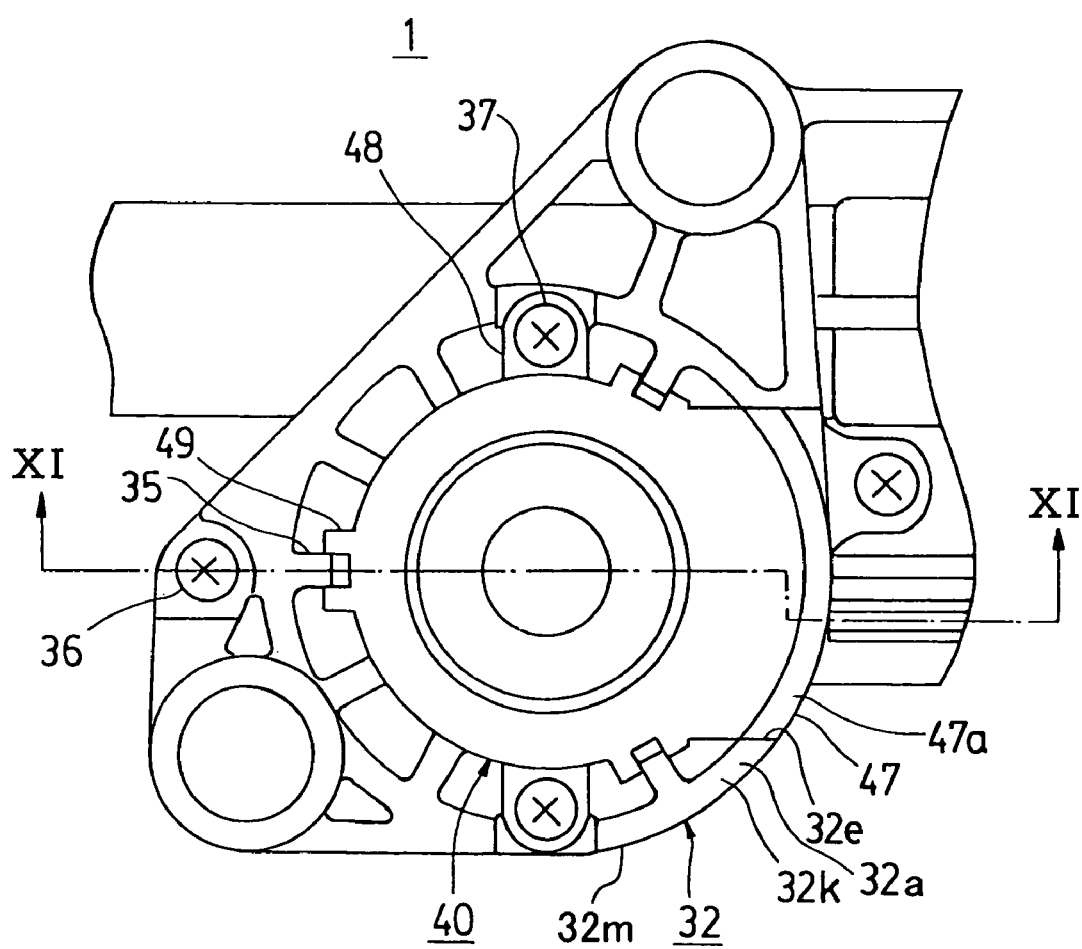
FIG. 10 is a partial plan view showing a portion of the seat drive motor around the sensor unit.
Figure 11:
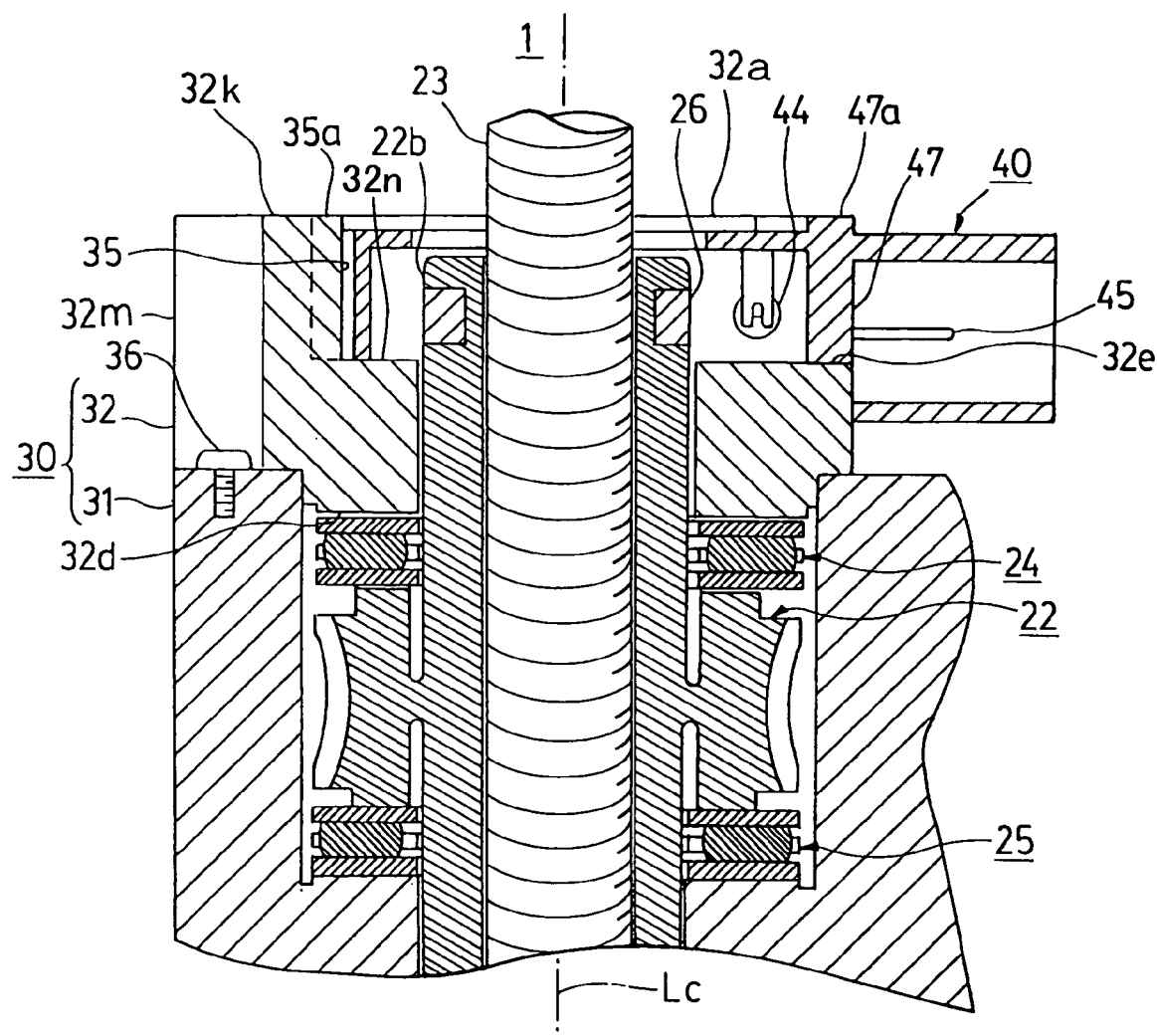
FIG. 11 is an enlarged cross sectional view taken along line XI-XI in FIG. 10.

The support wall 47 is engaged with the groove 32e of the second gear housing part 32 to increase an axial strength of the second gear housing part 32 (FIGS. 10 and 11). That is, in the seat drive motor 1 of the present embodiment, as described above, the groove 32e for outputting the signal is formed in the second gear housing part 32, and the groove 32e is reinforced by the support wall 47. The terminal plate 43 and the connector terminals 45 are integrated in the support wall 47 by insert molding.

Two connecting pieces 48 are formed in an outer peripheral part of the unit main body 41. A screw receiving hole 48a is formed in each connecting piece 48. A plurality (three in this case) of engaging portions 49 is formed in an outer peripheral part of the sensor unit 40, and each engaging portion 49 includes two ridges, which are parallel to one another. As shown in FIG. 10, predetermined ones of the ribs 35 (three of seven ribs) engage the engaging portions 49, respectively, so that the sensor unit 40 is positioned relative to the second gear housing part 32. In this state where the sensor unit 40 is positioned relative to the second gear housing part 32, screws 37 are threaded into the screw holes 32c of the second gear housing part 32 through the screw receiving holes 48a of the connecting pieces 48 of the sensor unit 40. Thus, the second gear housing part 32 and the sensor unit 40 are assembled together.

In this state where the sensor unit 40 is assembled to the second gear housing part 32, the extension 22b of the worm wheel 22 is arranged radially inward of the sensor unit 40 in such a manner that the rotation sensor 44 is radially opposed to the sensor magnet 26, as shown in FIG. 11. In the seat drive motor 1 of the present embodiment, upon rotation of the worm wheel 22, a change in the magnetic force of the sensor magnet 26 is sensed by the rotation sensor 44, and a pulse signal is externally outputted from the connector terminals 45 according to the change in the magnetic force of the sensor magnet 26.

Figure 12:
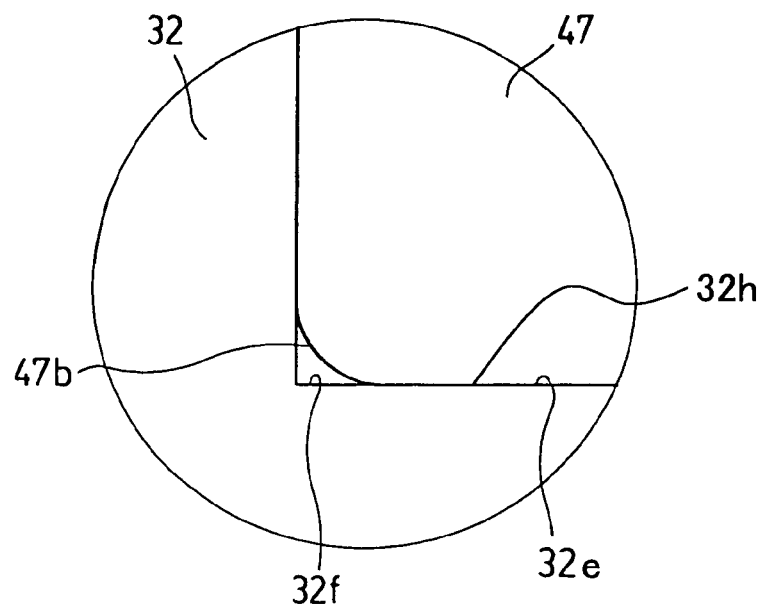
FIG. 12 is an enlarged view of an encircled portion XII in FIG. 1.
Figure 13:
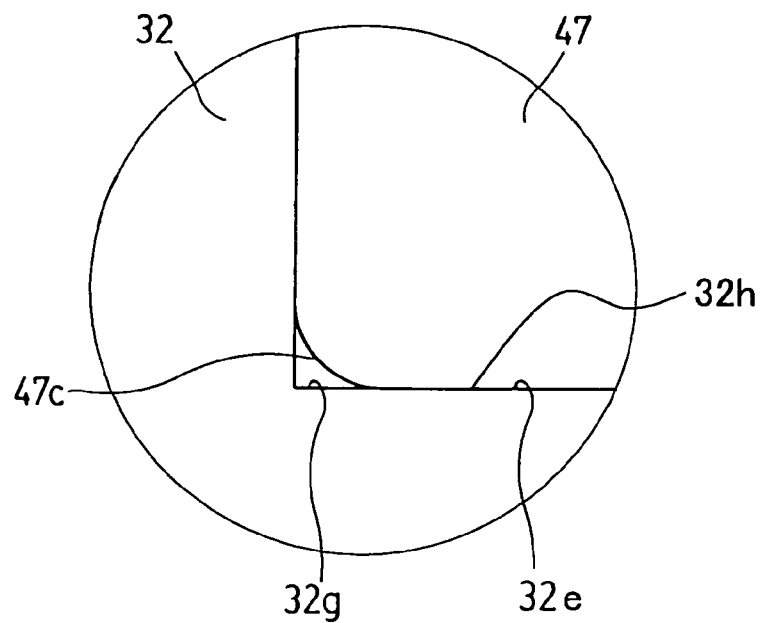
FIG. 13 is an enlarged view of an encircled portion XIII in FIG. 3.

As shown in FIGS. 10 and 11, when the sensor unit 40 is installed or is detachably installed to the second gear housing part 32, the support wall 47 is engaged with the groove 32e, and the end surface 47a of the support wall 47 is substantially flush with the end surface 32k of the end portion 32a of the second gear housing part 32. Furthermore, as shown in FIG. 12 (an enlarged view of a circled portion XII in FIG. 1), a corner 47b of the support wall 47 is processed to have an arcuate shape to avoid interference with the corner 32f of the groove 32e. Furthermore, as shown in FIG. 13 (an enlarged view of a circled portion XIII in FIG. 3), a corner 47c of the support wall 47 is also processed to have an arcuate shape to avoid interference with a corner 32g of the groove 32e. Furthermore, the support wall 47 of the present embodiment contacts a bottom portion 32h of the groove 32e of the second gear housing part 32 to support the gear housing 30 relative to the bracket 62 in the axial direction, as described in greater detail below.

The seat drive motor 1 of the present embodiment is secured to the vehicle seat 60 by the bracket 62, as shown in FIGS. 14 and 15. That is, the gear housing 30 is secured by the screws 38 while the gear housing 30 is held by the U-shaped bracket 62, which has the opposed flat portions 62a, 62b. In the seat drive motor 1 of the present embodiment, the multiple ribs 35 are formed in the receiving recess 32b of the second gear housing part 32 to support the support surface 32d of the second gear housing part 32 relative to the flat portion 62a of the bracket 62. Thus, in the seat drive motor 1 of the present embodiment, even when the thrust force of the worm wheel 22 is repeatedly applied to the support surface 32d of the second gear housing part 32, the thrust force is transmitted and is supported through the support surface 32d, the ribs 35 and the bracket 62 in this order. In this way, the flexure and deformation of the second gear housing part 32 can be limited to lengthen the lifetime of the second gear housing part 32.

In the seat drive motor 1 of the present embodiment, the multiple ribs 35 are arranged in the circumferential direction about the rotational axis Lc of the worm wheel 22. Thus, the support surface 32d of the second gear housing 32 can be more evenly supported by the flat portion 62a of the bracket 62. Furthermore, the ribs 35 are arranged to overlap with the support surface 32d in the axial direction of the worm wheel 22. Therefore, the supporting structure, which supports the thrust force of the worm wheel 22, i.e., the supporting structure, which includes the support surface 32d, the ribs 35 and the flat portion 62a of the bracket 62, can be linearly arranged. In this way, the strength against the thrust force can be further improved.

Furthermore, in the seat drive motor 1 of the present embodiment, the support wall 47 of the sensor unit 40 is interposed between the flat portion 62a of the bracket 62 and the second gear housing part 32 while the support wall 47 is engaged with the groove 32e of the second gear housing part 32. The support surface 32d of the second gear housing part 32 is supported relative to the flat portion 62a of the bracket 62 not only by the ribs 35 but also by the support wall 47. Furthermore, in the state where the sensor unit 40 is installed to the second gear housing part 32, the support wall 47 is engaged with the groove 32e, and the end surface 47a of the support wall 47 is substantially flush with the end surface 32k of the second gear housing part 32. That is, in the present embodiment, the end surface 32k of the second gear housing part 32, the end surface 47a of the support wall 47 and the end surface 35a of each rib 35 extend generally in the common plane, which is perpendicular to the axial direction of the rotational axis Lc of the worm wheel 22.

In this way, in the seat drive motor 1 of the present embodiment, the end surface 32k of the second gear housing part 32, the end surface 47a of the support wall 47 and the end surface 35a of each rib 35 substantially simultaneously contact the flat portion 62a of the bracket 62. Thus, the entire second gear housing part 32 is evenly supported relative to the flat portion 62a of the bracket 62 by the end surface 32k of the second gear housing part 32, the end surface 47a of the support wall 47 and the end surface 35a of each rib 35. Thus, at the time of operating the motor 1, even when the thrust force of the worm wheel 22 is applied to the support surface 32d of the second gear housing part 32, the thrust force can be spread over and can be supported by the end surface 32k of the second gear housing part 32, the end surface 47a of the support wall 47 and the end surface 35a of each rib 35. In this way, application of localized excessive force to the second gear housing part 32 can be limited, and concentration of the stress to the specific portion of the second gear housing part 32 can be limited. Thus, the flexure and deformation of the second gear housing part 32 can be limited to lengthen the lifetime of the second gear housing part 32.

Furthermore, as discussed above, the end surface 32k of the second gear housing part 32, the end surface 47a of the support wall 47 and the end surface 35a of each rib 35 substantially simultaneously contact the flat portion 62a of the bracket 62. In this way, the entire second gear housing part 32 can be evenly supported relative to the flat portion 62a of the bracket 62 by the end surface 32k of the second gear housing part 32, the end surface 47a of the support wall 47 and the end surface 35a of each rib 35. Thus, the second gear housing part 32 does not need to have an extra strength. As a result, it is not required to increase the wall thickness of the second gear housing part 32. In this way, the size of the second gear housing part 32 can be reduced, and the weight of the second gear housing part 32 can be reduced. Consequently, the material costs of the second gear housing part 32 can be reduced.

Furthermore, in the seat drive motor 1 of the present embodiment, as discussed above, the corner 47b of the support wall 47 has the arcuate shape, so that the corner 47b of the support wall 47 does not interfere with the corner 32f of the groove 32e (FIG. 12). Similarly, the corner 47c of the support wall 47 has the arcuate shape, so that the corner 47c of the support wall 47 does not interfere with the corner 32g of the groove 32e (FIG. 13). Thus, even when the second gear housing part 32 receives the load from the worm wheel 22 in the thrust direction, the corners 47b, 47c of the support wall 47 do not interfere with the corners 32f, 32g of the groove 32e. Therefore, it is possible to limit application of a localized excessive force to the corners 32f, 32g of the second gear housing part 32.

Next, the power seat system S, in which the seat drive motor 1 is installed, will be described with reference to FIGS. 16 and 17. The power seat system S is used in a seat of a vehicle, such as a passenger car. The power seat system S includes the lift mechanism 50, the vehicle seat 60 and the base member 70. The lift mechanism 50 vertically moves a seat cushion 61 of the vehicle seat 60 in an upward or downward direction and is installed to the base member 70. In the lift mechanism 50 of the present embodiment, the seat drive motor 1 is secured to the bracket 62. An arm 52 is formed integrally in the bracket 62.

A stationary bracket 53 is secured to the base member 70. A free end of the arm 52 is rotatably connected to an arm 54, which is formed in the stationary bracket 53, through a pin 55. The threaded shaft 23 is received in and is threadably engaged with the shaft receiving hole 22c of the worm wheel 22 (FIG. 2). When the worm wheel 22 is rotated, the threaded shaft 23 linearly moves forward or backward in the direction of X (X1, X2) in FIG. 16. One end of the first link member 57 is rotatably connected to one end of the threaded shaft 23. A rod 58 is secured to the other end of the first link member 57. The rod 58 is rotatably arranged in the base member 70. One end of a second link member 59 is secured to the rod 58 in such a manner that a predetermined angle is formed between the first link member 57 and the second link member 59. The other end of the second link member 59 is rotatably connected to a holding bracket 51, which is secured to a bottom surface 61a of the seat cushion 61.

In the power seat system S of the present embodiment, when an operation switch (not shown) is operated, the seat drive motor 1 is rotated to rotate the worm 21. When the worm 21 is rotated, the worm wheel 22 is rotated to move the threaded shaft 23 forward or backward in the direction of X (X1, X2). When the threaded shaft 23 is moved in the direction of X1 shown in FIG. 16, the first link member 57 is pivoted about the rod 58 in a direction of R1 to pivot the second link member 59 about the rod 58 in a direction of r1. When the second link member 59 is pivoted in the direction of r1, the seat cushion 61 is lifted through the holding bracket 51. In this way, the seat cushion 61 is lifted from a position indicated by a dot-dash line to a position indicated by a solid line in FIG. 17.

Figure 17:
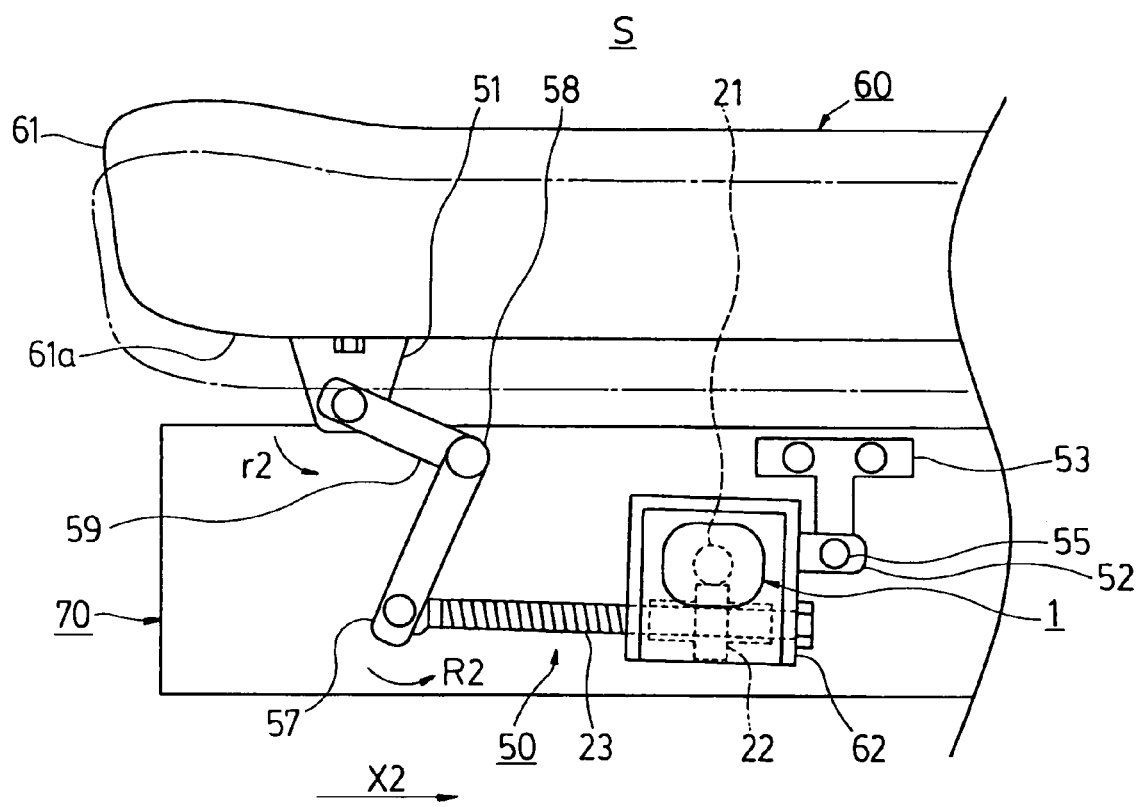
FIG. 17 is a partial schematic view of the power seat system of the present embodiment, showing two operational positions of a seat cushion of the power seat system.

In contrast, when the threaded shaft 23 is moved in the direction of X2 shown in FIG. 17, the first link member 57 is pivoted about the rod 58 in a direction of R2 to pivot the second link member 59 about the rod 58 in a direction of r2. When the second link member 59 is pivoted in the direction of r2, the seat cushion 61 is lowered through the holding bracket 51. In this way, the seat cushion 61 is lowered from the position indicated by the solid line to the position indicated by the dot-dash line in FIG. 17.

As discussed above, the present embodiment provides the following advantages.

(I) In the seat drive motor 1 of the present embodiment, the ribs 35 are formed in the receiving recess 32b of the second gear housing part 32 to support the support surface 32d of the second gear housing part 32 relative to the flat portion 62a of the bracket 62. Thus, in the seat drive motor 1 of the present embodiment, even when the thrust force of the worm wheel 22 is repeatedly applied to the support surface 32d of the second gear housing part 32 at the time of operating the motor 1, the thrust force is conducted through the support surface 32d, the ribs 35 and the bracket 62 in this order to support the thrust force. In this way, the flexure and deformation of the second gear housing part 32 can be limited to lengthen the lifetime of the second gear housing part 32.

(II) In the seat drive motor 1 of the present embodiment, the ribs 35 are circumferentially arranged about the rotational axis Lc of the worm wheel 22. Thus, the support surface 32d of the second gear housing part 32 can be effectively supported by the flat portion 62a of the bracket 62 through the ribs 35. Furthermore, the ribs 35 are arranged to overlap with the support surface 32d of the second gear housing part 32 in the axial direction of the rotational axis Lc of the worm wheel 22. Therefore, the supporting structure, which supports the thrust force of the worm wheel 22, i.e., the supporting structure, which includes the support surface 32d, the ribs 35 and the flat portion 62a of the bracket 62, can be linearly arranged. In this way, the strength against the thrust force can be further improved.

(III) In the seat drive motor 1 of the present embodiment, the end surface 32k of the second gear housing part 32, the end surface 47a of the support wall 47 and the end surface 35a of each rib 35 substantially simultaneously contact the flat portion 62a of the bracket 62. Thus, the entire second gear housing part 32 can be evenly supported relative to the flat portion 62a of the bracket 62 by the end surface 32k of the second gear housing part 32, the end surface 47a of the support wall 47 and the end surface 35a of each rib 35. Thus, even when the thrust force of the worm wheel 22 is applied to the support surface 32d of the second gear housing part 32 at the time of operating the motor 1, the thrust force can be spread over and can be supported by the end surface 32k of the second gear housing part 32, the end surface 47a of the support wall 47 and the end surface 35a of each rib 35. In this way, it is possible to limit application of localized excessive force to the second gear housing part 32 to limit concentration of stress in the specific local part of the second gear housing part 32. As a result, it is possible to limit flexure and deformation of the second gear housing part 32 to extend the lifetime of the second gear housing part 32.

(IV) In the seat drive motor 1 of the present embodiment, the end surface 32k of the second gear housing part 32, the end surface 47a of the support wall 47 and the end surface 35a of each rib 35 substantially simultaneously contact the flat portion 62a of the bracket 62. In this way, the entire second gear housing part 32 can be evenly supported by the flat portion 62a of the bracket 62. Thus, the second gear housing part 32 does not need to have an extra strength. As a result, it is not required to increase the wall thickness of the second gear housing part 32. In this way, the size of the second gear housing part 32 can be reduced, and the weight of the second gear housing part 32 can be reduced. Consequently, the material costs of the second gear housing part 32 can be reduced.

(V) In the seat drive motor 1 of the present embodiment, the corner 47b of the support wall 47 has the arcuate shape, so that the corner 47b of the support wall 47 does not interfere with the corner 32f of the groove 32e (FIG. 12). Similarly, the corner 47c of the support wall 47 has the arcuate shape, so that the corner 47c of the support wall 47 does not interfere with the corner 32g of the groove 32e (FIG. 13). Thus, even when the second gear housing part 32 receives the load from the worm wheel 22 in the thrust direction, the corners 47b, 47c of the support wall 47 do not interfere with the corners 32f, 32g of the groove 32e. Therefore, it is possible to limit application of the localized excessive force to the corners 32f, 32g of the second gear housing part 32.

(VI) In the seat drive motor 1 of the present embodiment, the support wall 47 has a sufficient strength to support the second gear housing part 32 when the support wall 47 contacts the flat portion 62a of the bracket 62. The connector terminals 45, through which the rotation measurement signal is outputted externally, are provided in the support wall 47. Therefore, the connector terminals 45 are securely fixed to the sensor unit 40. As a result, the connector terminals 45 can be reliably connected to corresponding external connector terminals. Therefore, the signal can be outputted externally from the connector terminals 45 in a stable and reliable manner.

The above embodiment can be modified in the following manner.

Figure 18:
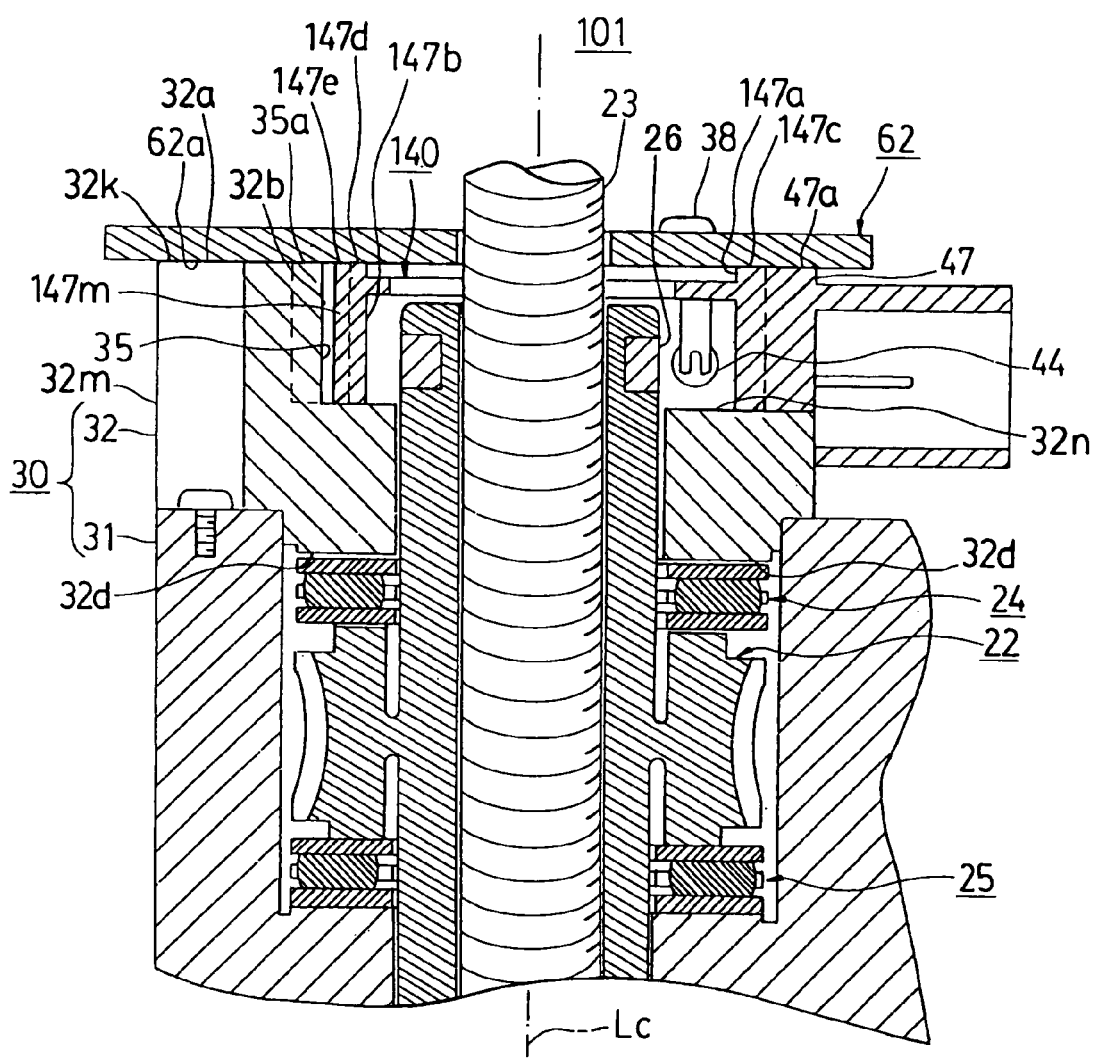
FIG. 18 is a schematic view showing a first modification of the seat drive motor.
Figure 19:
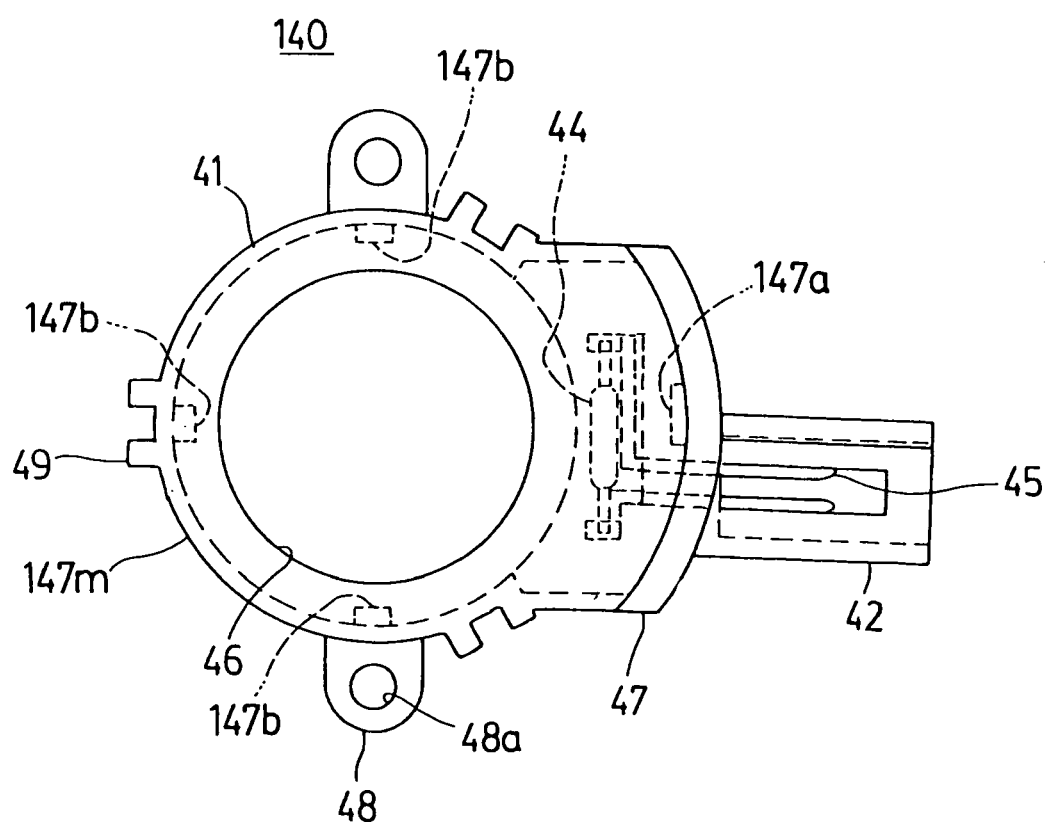
FIG. 19 is a plan view of a sensor unit of the seat drive motor of FIG. 18.

(1) In the above embodiment, the ribs 35 are provided in the second gear housing part 32. However, the present invention is not limited to this structure. For example, the above embodiment can be modified in a manner shown in FIGS. 18 and 19. FIG. 18 shows a first modification of the above embodiment. In the first modification of the present embodiment, the structures of the seat drive motor 101 other than the structure of the sensor unit 140 are the same as those of the above embodiment. Thus, in the following discussion, components, which are the same as those discussed in the above embodiment, will be indicated by the same numerals.

In the seat drive motor 101 of the first modification of the above embodiment, the sensor unit 140 includes sensor ribs 147a, 147b, which extend radially inward from a peripheral wall 147m of the sensor unit 140 and respectively contact a bottom surface 32n of the receiving recess 32b and the flat portion 62a of the bracket 62 in the axial direction of the rotational axis Lc of the worm wheel 22. The sensor ribs 147a, 147b are arranged at corresponding positions, which overlap with the support surface 32d in the axial direction of the worm wheel 22. Each rib 147a, 147b of the sensor unit 140 includes a bracket side end surface 147c, 147d, which contacts the bracket 62 in the axial direction of the worm wheel 22. The peripheral wall 147m of the sensor unit 140 has a bracket side end surface 147e, which contacts the bracket 62 in the axial direction of the worm wheel 22. The bracket side end surface 147c, 147d of each rib 147a, 147b of the sensor unit 140 and the bracket side end surface 147e of the peripheral wall 147m of the sensor unit 140 (also the end surface 47a of the support wall 47, which also serves as a part of the peripheral wall 147m) are located in a common plane that extends perpendicular to the axial direction of the worm wheel 22. Wit this structure, even when the thrust force of the worm wheel 22 is repeatedly applied to the support surface 32d of the second gear housing part 32, the thrust force can be effectively supported by the sensor ribs 147a, 147b.

Figure 20:
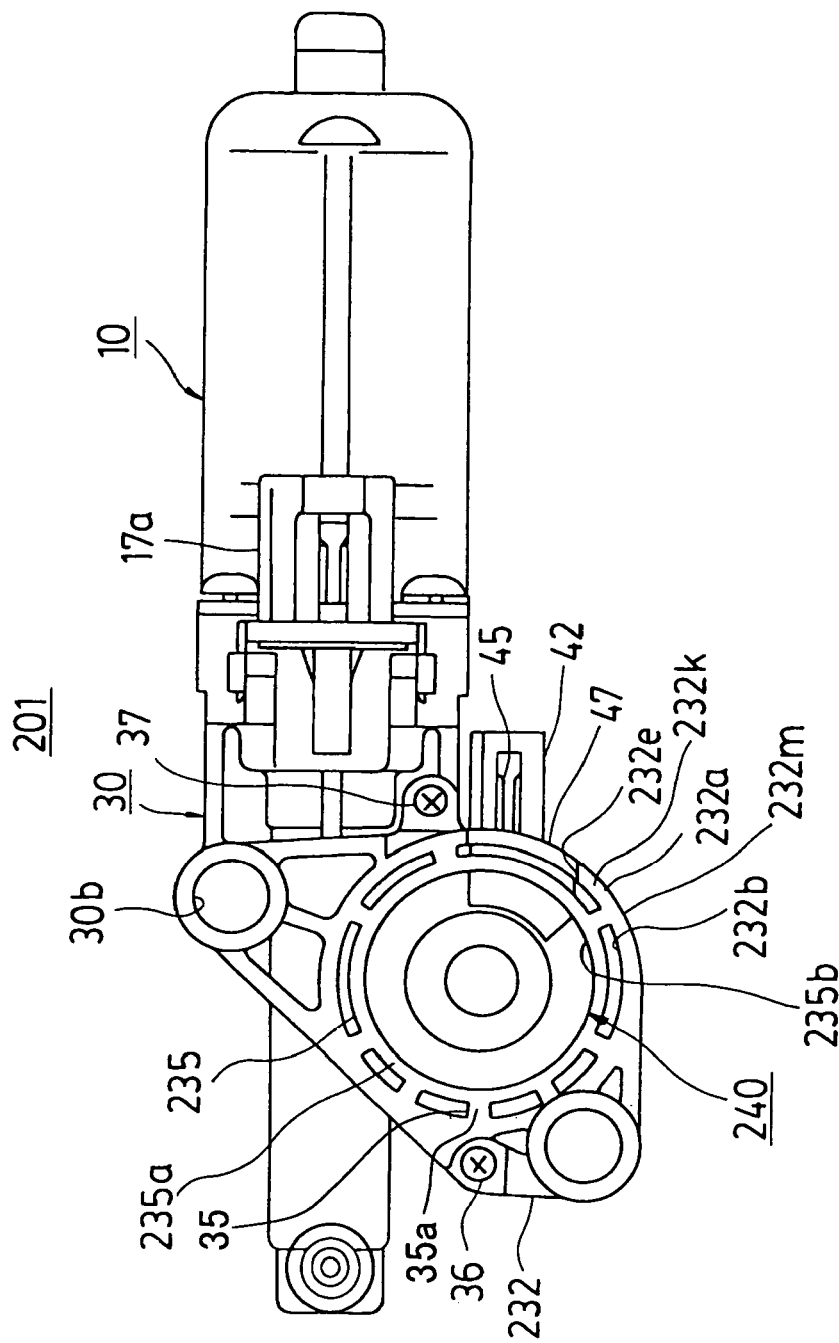
FIG. 20 is a schematic view showing a second modification of the seat drive motor.

(2) In the above embodiment, the ribs 35 are circumferentially arranged about the rotational axis Lc of the worm wheel 22. However, the present invention is not limited to this structure. For example, the above embodiment can be modified in a manner shown in FIG. 20. FIG. 20 shows a second modification of the above embodiment. In the second modification of the above embodiment, the structures of the seat drive motor 201 other than the structure of the second gear housing part 232 and the structure of the sensor unit 240 are the same as those of the above embodiment. Thus, in the following description, the components similar to those discussed above will be indicated by the same numerals.

In the seat drive motor 201 of the second modification of the above embodiment, an annular rib 235 is provided in the receiving recess 232b to improve the strength of the second gear housing part 232 in the axial direction of the worm wheel 22. An end surface 235a of the annular rib 235 is substantially flush with the end surface 232k of the end portion 232a of the second gear housing part 232, i.e., the end surface 232a of the peripheral wall 232m of the second gear housing part 232.

Even in the second modification, similar to the above embodiment, when the thrust force is applied to the support surface 32d (FIG. 15) of the second gear housing part 232, the end surface 232k of the end portion 232a of the second gear housing part 232, the end surface 235a of the annular rib 235 and the end surface 35a of the radial rib 35 substantially simultaneously contact the bracket 62 to effectively receive the thrust force. In this way, the wall thickness of the second gear housing part 232 at the support surface 32d can be reduced to achieve size reduction and weight reduction of the second gear housing part 232. Even in the present modification, similar to the above embodiment, a portion of the peripheral wall 232m of the recess 232b is axially recessed to form a notch or groove 232e that radially extends through the peripheral wall 232m of the recess 232b. The terminal plate (not shown) is arranged in the groove 232e to externally output a rotation measurement signal, i.e., a sensor signal.

In the above embodiment, the sensor unit 40 is installed in the axial direction of the rotational axis Lc of the worm wheel 22. However, the present invention is not limited to this. For example, in the second modification, the sensor unit 240 can be installed in the second gear housing 232 in the direction perpendicular to the rotational axis Lc of the worm wheel 22 through the groove 232e and a through hole 235b, which is formed in the annular rib 235. Furthermore, the radial ribs 35 may be eliminated to leave only the annular rib 235, if desired.

Figure 21:
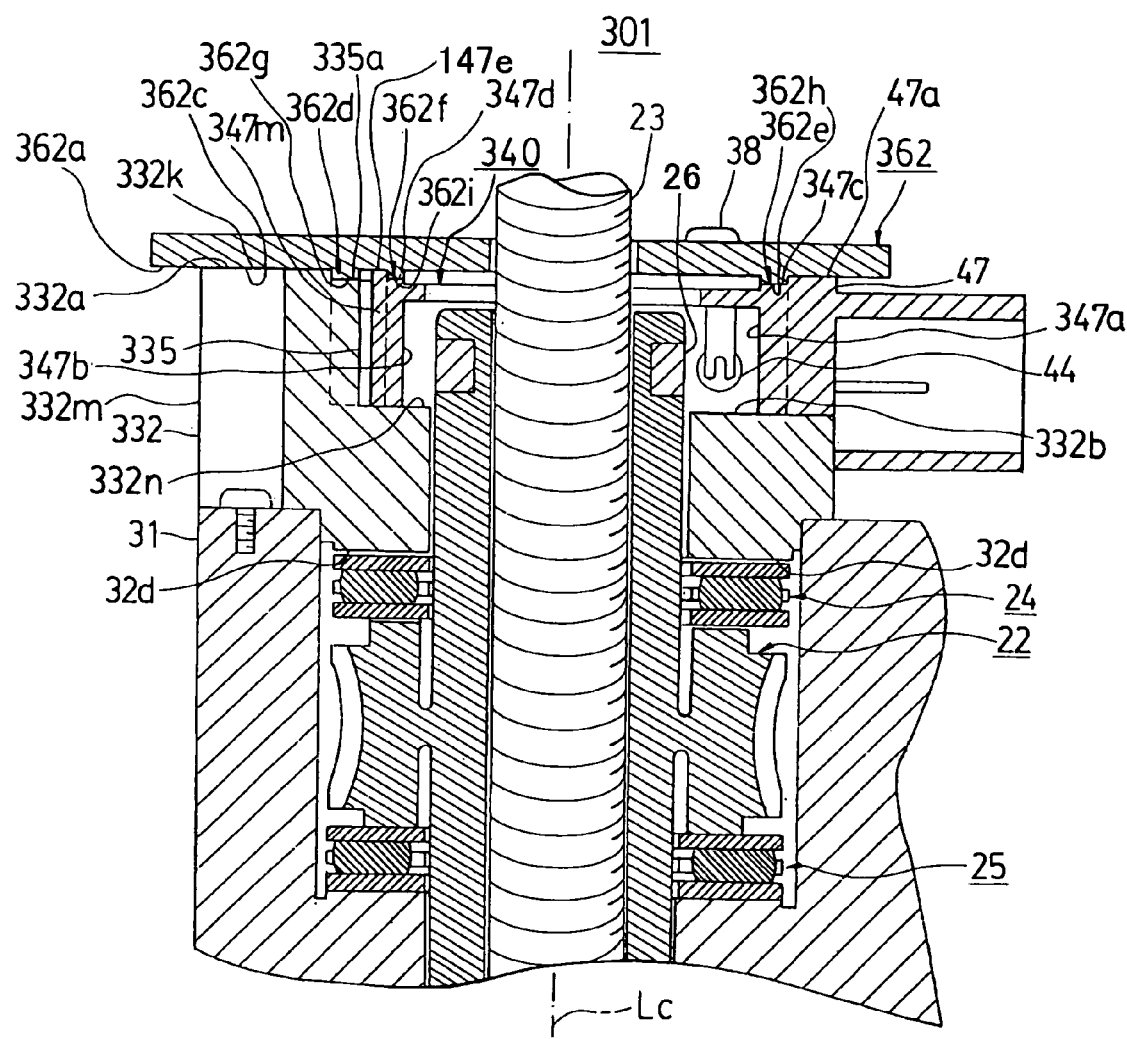
FIG. 21 is a schematic view showing a third modification of the seat drive motor.

(3) In the above embodiment, the end surface 35a of each rib 35 is substantially flush with the end surface 32k of the end portion 32a of the second gear housing part 32, and the end surface 32k of the end portion 32a of the second gear housing part 32 extend in the common plane, which is perpendicular to the rotational axis Lc of the worm wheel 22. In this way, the end surface 32k of the second gear housing part 32 and the end surface 35a of each rib 35 substantially simultaneously contact the flat portion 62a of the bracket 62. However, the present invention is not limited to this. For example, the above embodiment can be modified in a manner shown in FIG. 21. FIG. 21 shows a third modification of the present embodiment. In the third modification of the present embodiment, the structures of the seat drive motor 301 other than the structure of the second gear housing part 332, the structure of the bracket 362 and the structure of the sensor unit 340 are the same as those of the above embodiment. Thus, in the following description, components similar to those discussed above will be indicated by the same numerals.

In the seat drive motor 301 of the third modification, the sensor unit 340 includes the sensor ribs 347a, 347b, which extend radially inward from the peripheral wall 347m of the sensor unit 340 and respectively contact the bottom surface 332n of the receiving recess 332b and the flat portion 362a of the bracket 362 in the axial direction of the worm wheel 22. The sensor ribs 347a, 347b are arranged at corresponding positions, which overlap with the support surface 32d in the axial direction of the worm wheel 22. The ribs 335 are provided in the second gear housing part 332.

A projection 362d is formed in the flat portion 362a of the bracket 362 to project toward the ribs 335. Also, a projection 362e is formed in the flat portion 362a to project toward the sensor rib 347a. Furthermore, a projection 362f is formed in the flat portion 362a of the bracket 362 to project toward the sensor ribs 347b. A projecting end surface 362g of the projection 362d and a bracket 362 side end surface 335a of each rib 335 are constructed to contact with one another. A projecting end surface 362h of the projection 362e and a bracket 362 side end surface 347c of the sensor rib 347a are constructed to contact with one another. A projecting end surface 362i of the projection 362f and a bracket 362 side end surface 347d of the sensor rib 347b are constructed to contact with one another.

With the above arrangement, the gear housing side end surface 362c of the bracket 362, which is opposed to the end surface 332k of the end portion 332a of the second gear housing part 332, contacts the end surface 332k of the end portion 332a of the second gear housing part 332. Also at the same time, the projecting end surface 362g of the projection 362d contacts the bracket 362 side end surface 335a of each rib 335, and the projecting end surface 362h of the projection 362e contacts the bracket 362 side end surface 347c of the sensor rib 347a. Furthermore, the projecting end surface 362i of the projection 362f contacts the bracket 362 side end surface 347d of the sensor rib 347b. The bracket side end surface 335a of each rib 335 of the housing 30 is displaced from the bracket side end surface 332k of the peripheral wall 332m of the second gear housing part 332 of the housing 30 in the axial direction of the worm wheel 22. More specifically, the bracket side end surface 335a of each rib 335 of the housing 30 is closer to the other end 31a of the housing 30, which is opposite from the one end 332a of the housing 30, in comparison to the bracket side end surface 332k of the peripheral wall 332m of the housing 30. Furthermore, the bracket side end surface 347c, 347d of each rib 347a, 347b of the sensor unit 340 is displaced from the bracket side end surface 147e of the peripheral wall 347m of the sensor unit 340 in the axial direction of the worm wheel 22. More specifically, the bracket side end surface 347c, 347d of each rib 347a, 347b of the sensor unit 340 is closer to the other end 31a of the housing 30, which is opposite from the one end 332a of the housing 30, in comparison to the bracket side end surface 147e of the peripheral wall 347m of the sensor unit 340. Even with this modification, when the thrust force of the worm wheel 22 is repeatedly applied to the support surface 32d of the second gear housing part 332, the thrust force can be effectively supported.

Figure 22:
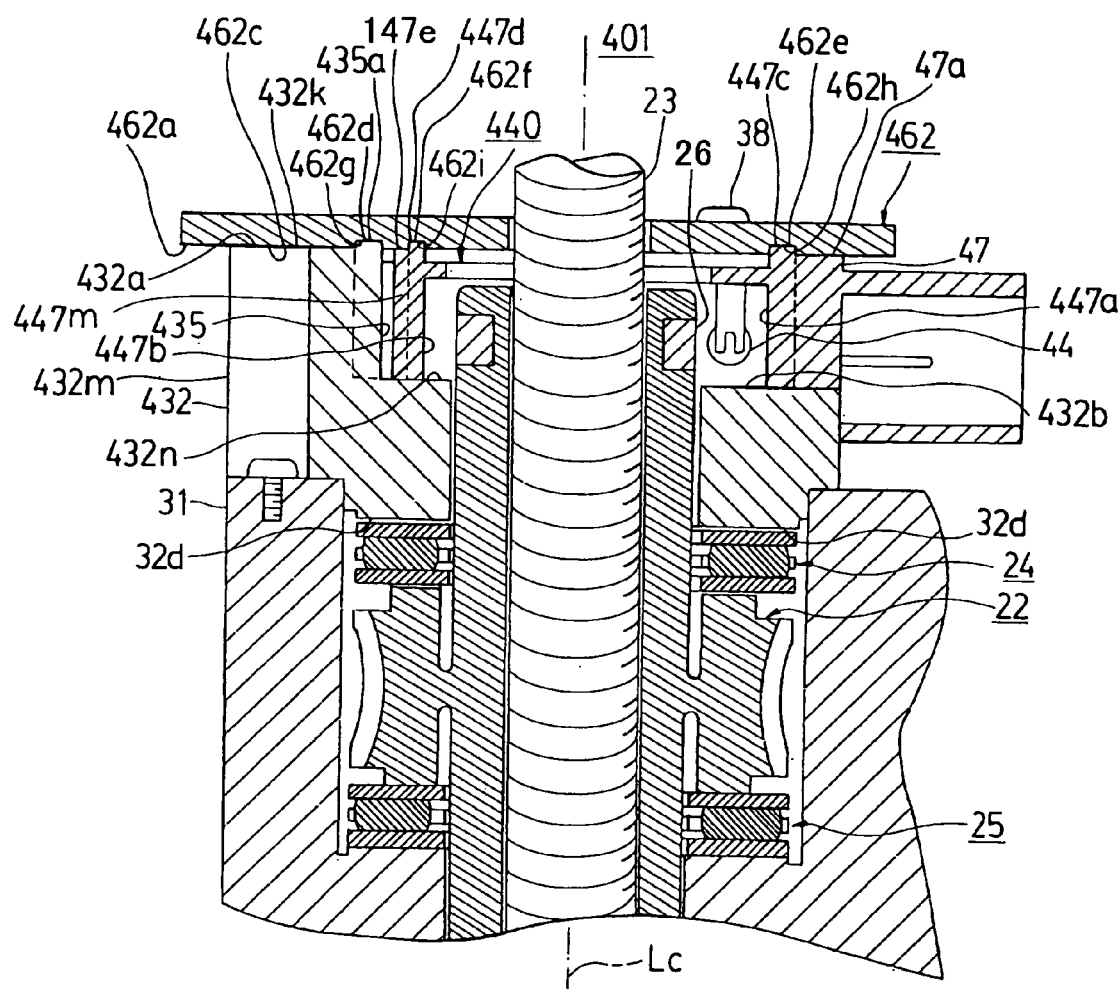
FIG. 22 is a schematic view showing a fourth modification of the seat drive motor.

(4) FIG. 22 shows a fourth modification of the present embodiment. In the fourth modification of the present embodiment, the structures of the seat drive motor 401 other than the structure of the second gear housing part 432, the structure of the bracket 462 and the structure of the sensor unit 440 are the same as those of the above embodiment. Thus, in the following description, components similar to those discussed above will be indicated by the same numerals.

In the seat drive motor 401 of the fourth modification, the sensor unit 440 includes the sensor ribs 447a, 447b, which extend radially inward from the peripheral wall 447m of the sensor unit 440 and respectively contact the bottom surface 432n of the receiving recess 432b and the flat portion 462a of the bracket 462 in the axial direction of the worm wheel 22. The sensor ribs 447a, 447b are arranged at corresponding positions, which overlap with the support surface 32d in the axial direction of the worm wheel 22. The ribs 435 are provided in the second gear housing part 432.

A recess 462d is recessed in the flat portion 462a of the bracket 462 in a direction away from the ribs 435. Also, a recess 462e is recessed in the flat portion 362a in a direction away from the sensor rib 447a. Furthermore, a recess 462f is recessed in the flat portion 462a of the bracket 462 in a direction away from the sensor rib 447b. A bottom surface 462g of the recess 462d and a bracket 462 side end surface 435a of each rib 435 are constructed to contact with one another. A bottom surface 462h of the recess 462e and a bracket 462 side end surface 447c of the sensor rib 447a are constructed to contact with one another. A bottom surface 462i of the recess 462f and a bracket 462 side end surface 447d of the sensor rib 447b are constructed to contact with one another.

With the above arrangement, the gear housing side end surface 462c of the bracket 462, which is opposed to the end surface 432k of the end portion 432a of the second gear housing part 432, contacts the end surface 432k of the end portion 432a of the second gear housing part 432. Also at the same time, the bottom surface 462g of the recess 462d contacts the bracket 462 side end surface 435a of each rib 435, and the bottom surface 462h of the recess 462e contacts the bracket 462 side end surface 447c of the sensor rib 447a. Furthermore, the bottom surface 462i of the recess 462f contacts the bracket 462 side end surface 447d of the sensor rib 447b. The bracket side end surface 432k of the peripheral wall 432m of the housing 30 is closer to the other end 31a of the housing 30, which is opposite from the one end 432a of the housing 30, in comparison to the bracket side end surface 435a of each rib 435 of the housing 30. Furthermore, the bracket side end surface 147e of the peripheral wall 447m of the sensor unit 440 is closer to the other end 31a of the housing 30, which is opposite from the one end 432a of the housing 30, in comparison to the bracket side end surface 447c, 447d of each rib 447a, 447b of the sensor unit 440. Even with this modification, when the thrust force of the worm wheel 22 is repeatedly applied to the support surface 32d of the second gear housing part 332, the thrust force can be effectively supported.

(5) In the above embodiment, the support wall 47 is formed integrally with the sensor unit 40. However, the present invention is not limited to this. For example, the support wall 47 can be formed integrally in the gear housing 30. Even with this construction, when the force is applied to the gear housing 30 upon operation of the motor unit 10 to move the gear housing 30 relative to the bracket 62 in the axial direction, the urging force of the gear housing 30 can be effectively supported by the support wall 47.

(6) In the above embodiment, the second gear housing part 32 is supported relative to the bracket 62 by the ribs 35 and the support wall 47. However, the present invention is not limited to this. For example, the similar arrangements, which are similar the ribs 35 and the support wall 47, can be used to support the first gear housing part 31 relative to the bracket 62.

(7) In the above embodiment, the support portion, which supports the second gear housing part 32 relative to the flat portion 62a of the bracket 62, is formed as the wall. However, the present invention is not limited to this. Alternatively, the support portion may include a plurality of ribs or ridges.

(8) In the above embodiment, the ribs 35 are formed in the receiving recess 32b. However, the present invention is not limited to this. For example, the ribs 35 can be formed in an outer peripheral region of the second gear housing part 32.

In the above embodiment, the power seat system of the present invention is used in the vehicle seat. Alternatively, the power seat system of the present invention may be used in a power seat system of, for example, an airplane, a train, furniture, a massage chair.

Additional advantages and modifications will readily occur to those skilled in the art. The invention in its broader terms is therefore not limited to the specific details, representative apparatus, and illustrative examples shown and described. The invention may include any combination of the features or limitations referred to herein.

What is claimed is:

1. A seat drive motor comprising: a bracket;
   a housing that is held by the bracket and receives a rotatable member and a linearly movable member; and
   a motor unit that drives the rotatable member, wherein:
   the linearly movable member is driven linearly through the rotatable member upon rotation of the motor unit;
   one end of the housing contacts the bracket;
   the housing includes:
   a rotatable member support portion that supports an axial force of the rotatable member, which is exerted in an axial direction of the rotatable member upon rotation of the rotatable member; and
   at least one rib that is arranged radially inward of a peripheral wall of the one end of the housing and at least partially overlaps with the rotatable member support portion in the axial direction of the rotatable member;
   the at least one rib contacts the bracket and supports the rotatable member support portion relative to the bracket in the axial direction of the rotatable member when the axial force of the rotatable member is applied to the at least one rib;

each rib of the housing has a bracket side end surface, which contacts the bracket in the axial direction of the rotatable member;
the peripheral wall of the housing has a bracket side end surface, which contacts the bracket in the axial direction of the rotatable member; and
the bracket side end surface of each rib of the housing and the bracket side end surface of the peripheral wall of the housing are located in a common plane that extends perpendicular to the axial direction of the rotatable member.

2. The seat drive motor according to claim 1, wherein the housing is made of resin.

3. The seat drive motor according to claim 1, wherein the at least one rib includes a plurality of radial ribs, which are circumferentially arranged one after another about a rotational axis of the rotatable member.

4. The seat drive motor according to claim 1, wherein the at least one rib includes at least one annular rib, which extends circumferentially about the rotational axis of the rotatable member.

5. A seat drive motor comprising:
a bracket;
a housing that is held by the bracket and receives a rotatable member and a linearly movable member; and
a motor unit that drives the rotatable member, wherein:
the linearly movable member is driven linearly through the rotatable member upon rotation of the motor unit;
one end of the housing contacts the bracket; the housing includes:
a rotatable member support portion that supports an axial force of the rotatable member, which is exerted in an axial direction of the rotatable member upon rotation of the rotatable member; and
at least one rib that is arranged radially inward of a peripheral wall of the one end of the housing and at least partially overlaps with the rotatable member support portion in the axial direction of the rotatable member; and
the at least one rib contacts the bracket and supports the rotatable member support portion relative to the bracket in the axial direction of the rotatable member when the axial force of the rotatable member is applied to the at least one rib;
each rib of the housing has a bracket side end surface, which contacts the bracket in the axial direction of the rotatable member;
the peripheral wall of the housing has a bracket side end surface, which contacts the bracket in the axial direction of the rotatable member; and
the bracket side end surface of each rib of the housing is displaced from the bracket side end surface of the peripheral wall of the housing in the axial direction of the rotatable member.

6. The seat drive motor according to claim 5, wherein the housing is made of resin.

7. The seat drive motor according to claim 5, wherein the at least one rib includes a plurality of radial ribs, which are circumferentially arranged one after another about a rotational axis of the rotatable member.

8. The seat drive motor according to claim 5, wherein the at least one rib includes at least one annular rib, which extends circumferentially about the rotational axis of the rotatable member.

9. The seat drive motor according to claim 5, further comprising a space member wherein:

the housing further includes a receiving recess, which is defined radially inward of the at least one rib at the one end of the housing; and
the space member is installed in the receiving recess of the housing and supports the housing relative to the bracket.

10. The seat drive motor according to claim 9, wherein the space member is detachably installed in the receiving recess of the housing.

11. The seat drive motor according to claim 9, wherein the space member is a sensor unit, which senses rotation of the rotatable member.

12. The seat drive motor according to claim 11, wherein:
the sensor unit includes a sensor element; and
the rotatable member includes a sensor magnet, which is radially opposed to the sensor element.

13. The seat drive motor according to claim 9, wherein the space member includes at least one rib, which supports the housing relative to the bracket.

14. The seat drive motor according to claim 13, wherein the at least one rib of the space member is arranged radially inward of a peripheral wall of the space member.

15. The seat drive motor according to claim 14, wherein:
each rib of the space member includes a bracket side end surface, which contacts the bracket in the axial direction of the rotatable member;
the peripheral wall of the space member has a bracket side end surface, which contacts the bracket in the axial direction of the rotatable member; and
the bracket side end surface of each rib of the space member and the bracket side end surface of the peripheral wall of the space member are located in a common plane that extends perpendicular to the axial direction of the rotatable member.

16. The seat drive motor according to claim 14, wherein:
each rib of the space member includes a bracket side end surface, which contacts the bracket in the axial direction of the rotatable member;
the peripheral wall of the space member has a bracket side end surface, which contacts the bracket in the axial direction of the rotatable member; and
the bracket side end surface of each rib of the space member is displaced from the bracket side end surface of the peripheral wall of the space member in the axial direction of the rotatable member.

17. The seat drive motor according to claim 16, wherein the bracket side end surface of each rib of the space member is closer to the other end of the housing, which is opposite from the one end of the housing, in comparison to the bracket side end surface of the peripheral wall of the space member.

18. The seat drive motor according to claim 16, wherein the bracket side end surface of the peripheral wall of the space member is closer to the other end of the housing, which is opposite from the one end of the housing, in comparison to the bracket side end surface of each rib of the space member.

19. A power seat system comprising:
the seat drive motor according to claim 5; and
a vehicle seat that is driven by the seat drive motor.

20. The seat drive motor according to claim 5, wherein the bracket side end surface of each rib of the housing is closer to the other end of the housing, which is opposite from the one end of the housing, in comparison to the bracket side end surface of the peripheral wall of the housing.

21. The seat drive motor according to claim 5, wherein the bracket side end surface of the peripheral wall of the housing is closer to the other end of the housing, which is opposite from the one end of the housing, in comparison to the bracket side end surface of each rib of the housing.

22. The seat drive motor according to claim 1, further comprising a space member wherein:
the housing further includes a receiving recess, which is defined radially inward of the at least one rib at the one end of the housing; and
the space member is installed in the receiving recess of the housing and supports the housing relative to the bracket.

23. The seat drive motor according to claim 22, wherein the space member is detachably installed in the receiving recess of the housing.

24. The seat drive motor according to claim 22, wherein the space member is a sensor unit, which senses rotation of the rotatable member.

25. The seat drive motor according to claim 24, wherein:
the sensor unit includes a sensor element; and
the rotatable member includes a sensor magnet, which is radially opposed to the sensor element.

26. The seat drive motor according to claim 22, wherein the space member includes at least one rib, which supports the housing relative to the bracket.

27. The seat drive motor according to claim 26, wherein the at least one rib of the space member is arranged radially inward of a peripheral wall of the space member.

28. The seat drive motor according to claim 27, wherein:
each rib of the space member includes a bracket side end surface, which contacts the bracket in the axial direction of the rotatable member;
the peripheral wall of the space member has a bracket side end surface, which contacts the bracket in the axial direction of the rotatable member; and
the bracket side end surface of each rib of the space member and the bracket side end surface of the peripheral wall of the space member are located in a common plane that extends perpendicular to the axial direction of the rotatable member.

29. The seat drive motor according to claim 27, wherein:
each rib of the space member includes a bracket side end surface, which contacts the bracket in the axial direction of the rotatable member;
the peripheral wall of the space member has a bracket side end surface, which contacts the bracket in the axial direction of the rotatable member; and
the bracket side end surface of each rib of the space member is displaced from the bracket side end surface of the peripheral wall of the space member in the axial direction of the rotatable member.

30. The seat drive motor according to claim 29, wherein the bracket side end surface of each rib of the space member is closer to the other end of the housing, which is opposite from the one end of the housing, in comparison to the bracket side end surface of the peripheral wall of the space member.

31. The seat drive motor according to claim 29, wherein the bracket side end surface of the peripheral wall of the space member is closer to the other end of the housing, which is opposite from the one end of the housing, in comparison to the bracket side end surface of each rib of the space member.

32. A power seat system comprising:
the seat drive motor according to claim 1; and
a vehicle seat that is driven by the seat drive motor.

* * * * *